(12) United States Patent
El Hamss et al.

(10) Patent No.: US 12,137,460 B2
(45) Date of Patent: Nov. 5, 2024

(54) METHODS, APPARATUS AND SYSTEMS FOR ENHANCED CONTROL SIGNALING OF ULTRA-RELIABLE TRANSMISSIONS

(71) Applicant: InterDigital Patent Holdings, Inc., Wilmington, DE (US)

(72) Inventors: Aata El Hamss, Laval (CA); Paul Marinier, Brossard (CA); Ghyslain Pelletier, Montréal (CA); Oghenekome Oteri, San Diego, CA (US); Faris Alfarhan, Montréal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 410 days.

(21) Appl. No.: 17/419,858

(22) PCT Filed: Jan. 6, 2020

(86) PCT No.: PCT/US2020/012343
§ 371 (c)(1),
(2) Date: Jun. 30, 2021

(87) PCT Pub. No.: WO2020/146247
PCT Pub. Date: Jul. 16, 2020

(65) Prior Publication Data
US 2022/0078768 A1    Mar. 10, 2022

Related U.S. Application Data

(60) Provisional application No. 62/931,389, filed on Nov. 6, 2019, provisional application No. 62/886,035, filed (Continued)

(51) Int. Cl.
*H04W 72/23* (2023.01)
*H04L 1/1812* (2023.01)
*H04W 72/21* (2023.01)

(52) U.S. Cl.
CPC ........... *H04W 72/23* (2023.01); *H04L 1/1812* (2013.01); *H04W 72/21* (2023.01)

(58) Field of Classification Search
CPC ...... H04W 72/23; H04W 72/21; H04L 1/1812
See application file for complete search history.

(56) References Cited

U.S. PATENT DOCUMENTS 9,603,099 B2    3/2017    Shin et al.
10,039,087 B2   7/2018    Nayeb Nazar et al.
(Continued)

FOREIGN PATENT DOCUMENTS

EP    3413637 A1       12/2018
JP    2012005034 A     1/2012
(Continued)

OTHER PUBLICATIONS

LG Electronics, "Discussion on layer 1 enhancements for URLLC", 3GPP Tdoc R1-1810294, 3GPP TSG RAN WG1 Meeting #94bis, Oct. 8-12, 2018, Chengdu, China, 11 pages.

(Continued)

*Primary Examiner* — Michael J Moore, Jr.
(74) *Attorney, Agent, or Firm* — Flaster Greenberg, P.C.

(57) ABSTRACT

Methods, apparatus, and systems are disclosed. One method includes the WTRU receiving a first Physical Downlink Shared Channel (PDSCH) associated with a first type of service or priority level in a first slot or mini slot and a second PDSCH associated with a second type of service or priority level in a second slot or mini-slot and determining a first HARQ codebook acknowledgment index (HCAI) based on a property of the first PDSCH or control information associated with the first PDSCH and a second HCAI based on a property of the second PDSCH or control information associated with the second PDSCH. The method includes generating for a subsequent slot or mini- (Continued)

slot, a first Physical Uplink Control Channel (PUCCH) including first HARQ-ACK information in accordance with the first HCAI and a second PUCCH including second HARQ-ACK information in accordance with the second HCAI and transmitting the first and second PUCCHs.

28 Claims, 15 Drawing Sheets

Related U.S. Application Data on Aug. 13, 2019, provisional application No. 62/875,227, filed on Jul. 17, 2019, provisional application No. 62/790,428, filed on Jan. 9, 2019.

(56) References Cited

U.S. PATENT DOCUMENTS

| | | | |
|---|---|---|---|
| 10,057,023 B2 | 8/2018 | Takeda et al. | |
| 10,375,649 B2 | 8/2019 | Seo et al. | |
| 10,609,696 B2 | 3/2020 | Lee et al. | |
| 10,980,049 B2 | 4/2021 | Yang et al. | |
| 11,382,121 B2 | 7/2022 | Marinier et al. | |
| 2010/0041430 A1 | 2/2010 | Ishii et al. | |
| 2010/0098012 A1 | 4/2010 | Bala et al. | |
| 2011/0038271 A1 | 2/2011 | Shin et al. | |
| 2011/0170499 A1 | 7/2011 | Nayeb et al. | |
| 2011/0280206 A1 | 11/2011 | Johansson et al. | |
| 2012/0051319 A1 | 3/2012 | Kwon et al. | |
| 2012/0076023 A1 | 3/2012 | Ko et al. | |
| 2012/0113831 A1 | 5/2012 | Pelletier et al. | |
| 2012/0230268 A1 | 9/2012 | Marinier et al. | |
| 2013/0163532 A1 | 6/2013 | Anderson et al. | |
| 2013/0163533 A1 | 6/2013 | Anderson et al. | |
| 2013/0163534 A1 | 6/2013 | Anderson et al. | |
| 2013/0163535 A1 | 6/2013 | Anderson et al. | |
| 2013/0163536 A1 | 6/2013 | Anderson et al. | |
| 2013/0163537 A1 | 6/2013 | Anderson et al. | |
| 2013/0208691 A1 | 8/2013 | Yang et al. | |
| 2013/0242923 A1 | 9/2013 | Yang et al. | |
| 2014/0029528 A1 | 1/2014 | Han et al. | |
| 2014/0056278 A1 | 2/2014 | Marinier et al. | |
| 2014/0219202 A1 | 8/2014 | Kim et al. | |
| 2015/0063252 A1 | 3/2015 | Zhang et al. | |
| 2015/0085714 A1* | 3/2015 | Liang | H04L 5/1469 370/280 |
| 2016/0135147 A1 | 5/2016 | Ouchi et al. | |
| 2016/0150524 A1 | 5/2016 | Ramkumar et al. | |
| 2016/0226629 A1 | 8/2016 | Liu et al. | |
| 2016/0226645 A1 | 8/2016 | Kim et al. | |
| 2016/0295574 A1 | 10/2016 | Papasakellariou | |
| 2016/0338041 A1* | 11/2016 | Li | H04W 52/143 |
| 2017/0013565 A1 | 1/2017 | Pelletier et al. | |
| 2017/0013612 A1 | 1/2017 | Nayeb et al. | |
| 2017/0041923 A1 | 2/2017 | Park | |
| 2017/0105179 A1 | 4/2017 | Kusashima et al. | |
| 2017/0245262 A1 | 8/2017 | Nayeb Nazar et al. | |
| 2017/0288819 A1 | 10/2017 | Chen et al. | |
| 2017/0310531 A1 | 10/2017 | Dinan | |
| 2018/0076942 A1* | 3/2018 | Nory | H04L 5/0042 |
| 2018/0123744 A1 | 5/2018 | Nogami et al. | |
| 2018/0159675 A1 | 6/2018 | Yang et al. | |
| 2018/0167915 A1 | 6/2018 | Lee et al. | |
| 2018/0242321 A1 | 8/2018 | Takeda et al. | |
| 2018/0332566 A1 | 11/2018 | You et al. | |
| 2019/0124647 A1* | 4/2019 | Li | H04L 1/1825 |
| 2019/0230685 A1 | 7/2019 | Park et al. | |
| 2019/0246416 A1 | 8/2019 | Park et al. | |
| 2019/0261356 A1* | 8/2019 | Myung | H04W 72/02 |
| 2019/0297618 A1* | 9/2019 | Yang | H04L 5/0044 |
| 2019/0349973 A1* | 11/2019 | Yang | H04W 72/23 |
| 2019/0394758 A1* | 12/2019 | Cheng | H04W 24/08 |
| 2020/0106586 A1* | 4/2020 | Nemeth | H04L 1/1854 |
| 2021/0184801 A1* | 6/2021 | El Hamss | H04L 1/1896 |
| 2021/0243785 A1* | 8/2021 | Yoshioka | H04W 72/0446 |
| 2022/0038242 A1* | 2/2022 | Yoshioka | H04L 5/0055 |

FOREIGN PATENT DOCUMENTS

| | | |
|---|---|---|
| JP | 2012517747 A | 8/2012 |
| JP | 2013507067 A | 2/2013 |
| JP | 2017507583 A | 3/2017 |
| JP | 2018528727 A | 9/2018 |
| JP | 2021523617 A | 9/2021 |
| RU | 2499367 C2 | 11/2013 |
| WO | WO 2008/101053 A2 | 8/2008 |
| WO | WO 2011/041623 A1 | 4/2011 |
| WO | WO 2013/027967 A2 | 2/2013 |
| WO | WO 2014/151150 A1 | 9/2014 |
| WO | WO 2015/021318 A2 | 2/2015 |
| WO | WO 2015/171234 A1 | 11/2015 |
| WO | 2016/040290 A1 | 3/2016 |
| WO | WO 2016116165 A1 | 7/2016 |
| WO | WO 2016/195177 A1 | 12/2016 |
| WO | WO 2018/128493 A1 | 7/2018 |
| WO | 2018203686 A1 | 11/2018 |
| WO | WO 2018/204730 A1 | 11/2018 |
| WO | WO 2019217696 A1 | 11/2019 |

OTHER PUBLICATIONS

LG Electronics, "UCI enhancements for NR URLLC", 3GPP Tdoc R1-1812573, 3GPP TSG RAN WG1 Meeting #95, Nov. 12-16, 2018, Spokane, USA, 4 pages.

Huawei, et al., "HARQ-ACK enhancements for URLLC", 3GPP Tdoc R1-1809342, 3GPP TSG RAN WG1 Meeting #94, Aug. 20-24, 2018, Gothenburg, Sweden, 3 pages.

"3rd Generation Partnership Project; Technical Specification Group Radio Access Network; NR; Medium Access Control (MAC) protocol specification (Release 15)" TS 38.321 V15.1.0, Mar. 2018, pp. 1-67.

"3rd Generation Partnership Project; Technical Specification Group Radio Access Network; NR; Physical layer procedures for control (Release 15)" 3GPP TS 38.213, V15.0.0, Dec. 2017, 56 pages.

Institute for Information Industry (III), "HARQ-ACK feedback enhancement for URLLC", 3GPP Tdoc R1-1811391, 3GPP TSG RAN WG1 Meeting #94bis, Oct. 8-12, 2018, Chengdu, P.R. China, 5 pages.

Third Generation Partnership Project (3GPP), "Overview of DL Control Channel Design", Ericsson, 3GPP TSG-RAN WG1 Meeting #89, Hangzhou, China, May 15-19, 2017, R1-1709062, 10 pages.

Third Generation Partnership Project (3GPP), "UL Channel Transmission for MTC Coverage Enhancement", LG Electronics, 3GPP TSG RAN WG1 #76, Prague, Czech Republic Feb. 10-14, 2014, R1-140308, 5 pages.

Third Generation Partnership Project (3GPP), "On low-latency UCI transmission", Nokia, Alcatel-Lucent Shanghai Bell, 3GPP TSG RAN WG1#89, Hangzhou, P.R. China, May 15-19, 2017, R1-1708519, 2 pages.

Third Generation Partnership Project (3GPP), "CSI Multiplexing and Collision Handling in Periodic Feedback" MediaTek Inc., 3GPP TSG RAN WG1 Meeting #70bis, San Diego, USA, Oct. 8-12, 2012, R1-124280, 4 pages.

Third Generation Partnership Project (3GPP), "Summary of Informal Email Discussion on PUSCH", Sierra Wireless, 3GPP TSG RAN WG1 Meeting #83, Anaheim, USA, Nov. 15-22, 2015, R1-157501, 15 pages.

Third Generation Partnership Project (3GPP), "Analysis of URLLC reliability for HARQ", ZTE, ZTE Microelectronics, 3GPP TSG RAN WG1 Meeting #88, Athens, Greece Feb. 13-17, 2017, R1-1701595, 15 pages.

Third Generation Partnership Project (3GPP), "Further details of common control signaling", CATT, 3GPP TSG RAN WG1 Meeting #88, Athens, Greece, Feb. 13-17, 2017, R1-1702091, 5 pages.

(56) References Cited

OTHER PUBLICATIONS

Third Generation Partnership Project (3GPP), "Discussion on UCI and data multiplexing for uplink control channel", Panasonic, 3GPP TSG RAN WG1 Meeting #88bis, Spokane, USA, Apr. 3-7, 2017, R1-1705455, 3 pages.
Third Generation Partnership Project (3GPP), "Coreset and BD for NR-PDCCH", Vivo, 3GPP TSG RAN WG1 Meeting #89, Hangzhou, P.R. China May 15-19, 2017, R1-1707232, 3 pages.
Third Generation Partnership Project (3GPP), "On Retransmission Decoder Throughput Issues and CBG-based HARQ Protocol", Ericsson, 3GPP TSG-RAN WG1 Meeting #89, Hangzhou, P.R. China May 15-19, 2017, R1-1709109, 4 pages.
Third Generation Partnership Project (3GPP), "Considerations for URLLC resource allocation for PUCCH", Qualcomm Incorporated, 3GPP TSG RAN WG1 Meeting #93, Busan, Korea, May 21-May 25, 2018, R1-1807362, 3 pages.
ETSI, Digital Cellular Telecommunications System (Phase 2+); Universal Mobile Telecommunications System (UMTS); General Packet Radio Service (GPRS); GPRS Tunnelling Protocol (GTP); across the Gn and Gp Interface (3GPP TS 29.060 Version 12.8.0 Release 12); ETSI TS 129 060 V12.8.0, Apr. 2015, 188 pages.
Third Generation Partnership Project (3GPP), "GPRS Tunnelling Protocol (GTP) Across the Gn and Gp Interface", Technical Specification Group Core Network and Terminals; General Packet Radio Service (GPRS), Release 12, 3GPP TS 29.060 V12.8.0, Mar. 2015, 184 pages.
JP 2012005034 A, Cited in Non-Final Office Action dated Mar. 30, 2021, in related Japanese Patent Application No. 2019568394. *English translation of description and claims provided by Espacenet.com.
WO 2013/027967 A2, Cited in Information Disclosure Statement dated May 19, 2022, in related U.S. Appl. No. 16/621,129.
RU 2499367 C2, Cited in Notice of Allowance dated Oct. 21, 2021, in related Russian Patent Application No. 2019141040. *English equivalent of description and claims provided by Espacenet.com.
Third Generation Partnership Project (3GPP), "Discussion on PUCCH Overlap Issues", Panasonic, 3GPP TSG RAN WG1 Meeting #93, Busan, Korea, May 21-25, 2018, R1-1806180, 4 pages.
Third Generation Partnership Project (3GPP), "On PUCCH Resource Allocation and Other Issues", Ericsson, 3GPP TSG RAN WG1 Meeting AH 1801, Vancouver, Canada, Jan. 22-26, 2018, R1-1800950, 7 pages.

* cited by examiner

FIG. 10

1010 — RECEIVE, BY THE WTRU, A FIRST PHYSICAL DOWNLINK SHARED CHANNEL (PDSCH) ASSOCIATED WITH A FIRST TYPE OF SERVICE OR PRIORITY LEVEL IN A FIRST SLOT OR FIRST MINI SLOT AND A SECOND PDSCH ASSOCIATED WITH A SECOND TYPE OF SERVICE OR PRIORITY LEVEL IN A SECOND SLOT OR SECOND MINI-SLOT

↓

1020 — DETERMINE, BY THE WTRU, A FIRST HARQ CODEBOOK ACKNOWLEDGMENT INDEX (HCAI) BASED ON A PROPERTY OF THE FIRST PDSCH OR CONTROL INFORMATION ASSOCIATED WITH THE FIRST PDSCH AND A SECOND HCAI BASED ON A PROPERTY OF THE SECOND PDSCH OR CONTROL INFORMATION ASSOCIATED WITH THE SECOND PDSCH

↓

1030 — GENERATE, BY THE WTRU, FOR ANY OF: THE SECOND SLOT, THE SECOND MINI-SLOT, A SUBSEQUENT SLOT OR A SUBSEQUENT MINI-SLOT, A FIRST PHYSICAL UPLINK CONTROL CHANNEL (PUCCH) INCLUDING FIRST HARQ ACKNOWLEDGMENT (HARQ-ACK) INFORMATION IN ACCORDANCE WITH THE FIRST HCAI AND A SECOND PUCCH INCLUDING SECOND HARQ-ACK INFORMATION IN ACCORDANCE WITH THE SECOND HCAI

↓

1040 — TRANSMIT, BY THE WTRU TO A NETWORK ENTITY, THE FIRST AND SECOND PUCCHS

FIG. 11

1110 — RECEIVE, BY THE WTRU, A PLURALITY OF PHYSICAL DOWNLINK SHARED CHANNELS (PDSCHS) ASSOCIATED WITH DIFFERENT PRIORITY LEVELS IN A PLURALITY OF SLOTS OR MINI-SLOTS

↓

1120 — DETERMINE, BY THE WTRU, A HARQ CODEBOOK ACKNOWLEDGMENT INDEX (HCAI) AND A PRIORITY LEVEL FOR EACH OF THE RECEIVED PLURALITY OF PDSCHS

↓

1130 — DETERMINE A NUMBER OF PUCCHS TO BE TRANSMITTED FOR A RESPECTIVE SLOT OR A RESPECTIVE MINI SLOT BASED ON THE DETERMINED HCAIS AND THE DETERMINED PRIORITY LEVEL

↓

1140 — MULTIPLEX, BY THE WTRU, IN RESPECTIVELY DIFFERENT PUCCH RESOURCES OF THE RESPECTIVE SLOT OR THE RESPECTIVE MINI SLOT, THE NUMBER OF PUCCHS

↓

1150 — TRANSMIT, BY THE WTRU, ON THE RESPECTIVE SLOT OR THE RESPECTIVE MINI SLOT, THE DETERMINED NUMBER OF PUCCHS

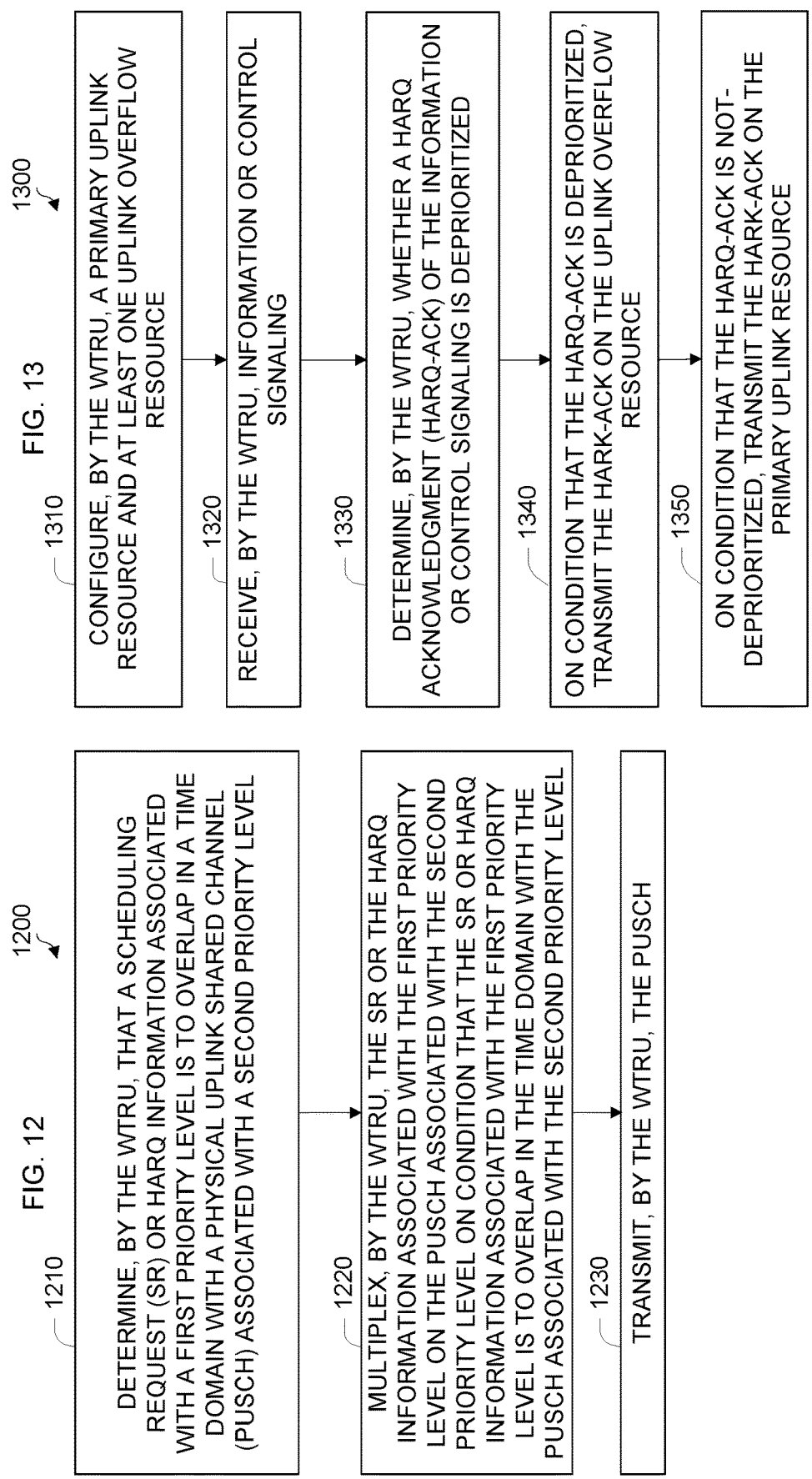

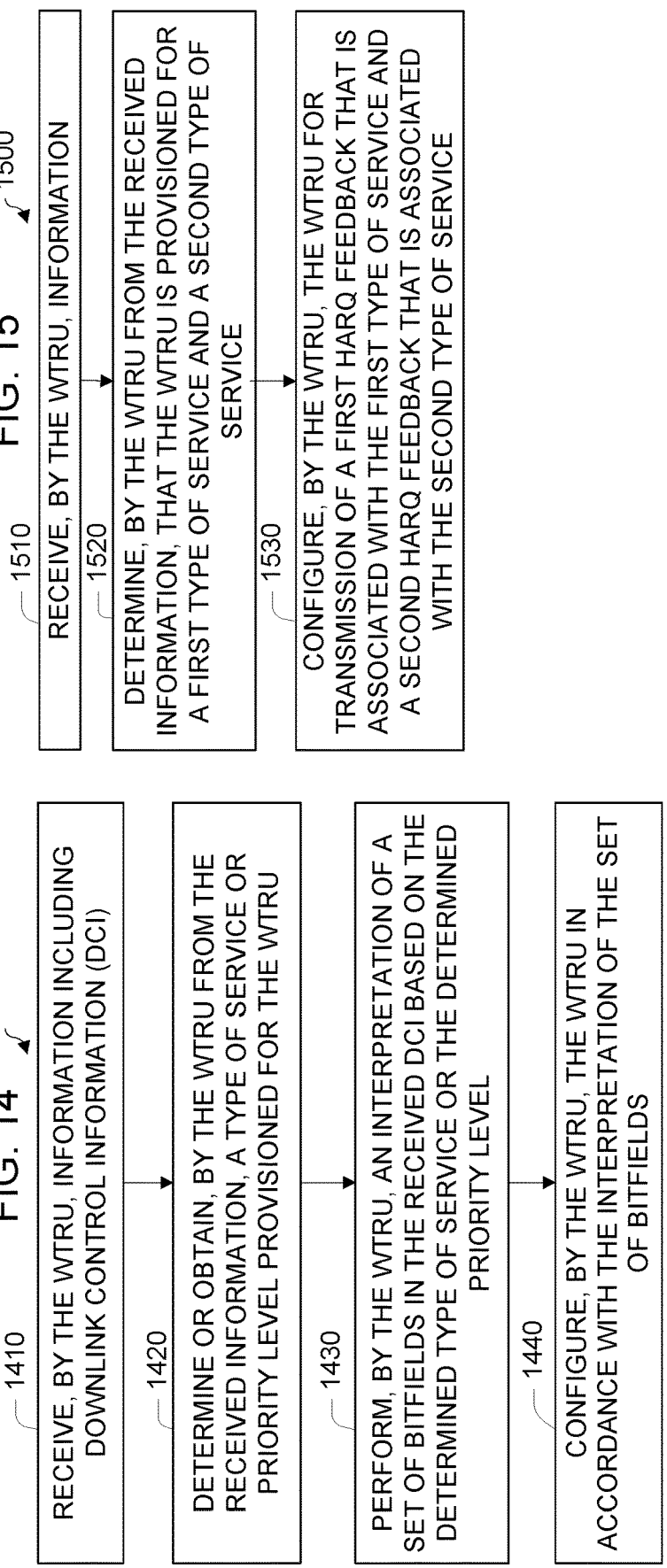

- 1610 RECEIVE, BY THE WTRU, INFORMATION
- 1620 DETERMINE, BY THE WTRU FROM THE RECEIVED INFORMATION, THAT THE WTRU IS PROVISIONED FOR A FIRST TYPE OF SERVICE
- 1630 GENERATE, BY THE WTRU, CODED BITS FOR TRANSMISSION ASSOCIATED WITH THE FIRST TYPE OF SERVICE
- 1640 OVERWRITE, BY THE WTRU, A SUBSET OF THE CODED BITS GENERATED, AS OVERWRITTEN CODED BITS, WITH CODED BITS ASSOCIATED WITH A SECOND TYPE OF SERVICE TO GENERATE A SEQUENCE OF CODED BITS ASSOCIATED WITH THE FIRST AND SECOND SERVICE, THE SECOND TYPE OF SERVICE HAVING A HIGHER PRIORITY LEVEL THAN A PRIOR LEVEL OF THE FIRST TYPE OF SERVICE
- 1650 GENERATE, USING THE SEQUENCE OF CODED BITS ASSOCIATED WITH THE FIRST AND SECOND SERVICE, A SIGNAL FOR TRANSMISSION
- 1660 TRANSMIT, BY THE WTRU TO A NETWORK ENTITY, THE SIGNAL

- 1710 SELECT ANY OF: (1) A MULTIPLEXING OPERATION TO MULTIPLEX CODED BITS OF A FIRST TYPE OF SERVICE OR FIRST PRIORITY LEVEL WITH CODED BITS OF A SECOND TYPE OF SERVICE OR SECOND PRIORITY LEVEL; (2) AN OVERWRITING OPERATION TO OVERWRITE CODED BITS OF A FIRST TYPE OF SERVICE OR FIRST PRIORITY LEVEL WITH CODED BITS OF A SECOND TYPE OF SERVICE OR SECOND PRIORITY LEVEL; OR (3) A DROPPING/INSERTING OPERATION TO DROP CODED BITS OF A FIRST TYPE OF SERVICE OR FIRST PRIORITY LEVEL AND TO INSERT, INTO THE POSITIONS OF THE DROPPED CODED BITS, CODED BITS OF A SECOND TYPE OF SERVICE OR SECOND PRIORITY LEVEL BASED ON SUITABILITY CRITERIA
- 1720 GENERATE A SEQUENCE OF CODED BITS ASSOCIATED WITH THE FIRST AND SECOND SERVICES OR PRIORITY LEVELS USING THE SELECTED OPERATION
- 1730 GENERATE, USING THE SEQUENCE OF CODED BITS, A SIGNAL FOR TRANSMISSION
- 1740 TRANSMIT, BY THE WTRU TO A NETWORK ENTITY, THE SIGNAL

METHODS, APPARATUS AND SYSTEMS FOR ENHANCED CONTROL SIGNALING OF ULTRA-RELIABLE TRANSMISSIONS

CROSS REFERENCE TO RELATED APPLICATIONS

This application is a § 371 U.S. National Stage entry of PCT Application No. PCT/US2020/012343, filed Jan. 6, 2020, which is a non-provisional filing of, and claims the benefit of priority to U.S. Patent Application Ser. No. 62/790,428, filed Jan. 9, 2019, U.S. Patent Application Ser. No. 62/875,227 filed Jul. 17, 2019, U.S. Patent Application Ser. No. 62/886,035 filed Aug. 13, 2019 and U.S. Patent Application Ser. No. 62/931,389 filed Nov. 6, 2019, the contents of each of which being incorporated by reference as if fully set forth herein, for all purposes.

FIELD

Embodiments disclosed herein generally relate to wireless communications and, for example to methods, apparatus and systems for enhanced control signaling (e.g., of ultra-reliable transmissions), for example based on a type of service.

RELATED ART

Certain network can be implemented with network slicing principles, which may allow for Ultra-Reliable Transmissions.

SUMMARY

Methods and apparatus for operation by a wireless transmit/receive unit (WTRU) in a network are provided. In one embodiment, a method may include the WTRU receiving a first Physical Downlink Shared Channel (PDSCH) associated with a first type of service or a first priority level in a first slot or first mini slot and a second PDSCH associated with a second type of service of a second priority level in a second slot or second mini-slot and determining a first HARQ codebook acknowledgment index (HCAI) based on a property of the first PDSCH or control information associated with the first PDSCH and a second HCAI based on a property of the second PDSCH or control information associated with the second PDSCH. The method may further include generating for a subsequent slot or a subsequent mini-slot, a first Physical Uplink Control Channel (PUCCH) including first HARQ-ACK information in accordance with the first HCAI and a second PUCCH including second HARQ-ACK information in accordance with the second HCAI and transmitting the first and second PUCCHs.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 10 is a flowchart illustrating a representative procedure using feedback information (e.g., HCAIs);

FIG. 11 is a flowchart illustrating another representative procedure using feedback information (e.g., HCAIs);

FIG. 12 is a flowchart illustrating a representative procedure for time domain overlaps (e.g., of eMBB and URLLC or enhanced URLLC information/control signaling);

FIG. 13 is a flowchart illustrating a representative procedure using overflow resources for deprioritized information/control signaling (e.g., HARQ acknowledgements (HARQ-ACKs));

FIG. 14 is a flowchart illustrating a representative procedure using bitfield interpretation (e.g., based on service type);

FIG. 15 is a flowchart illustrating a representative procedure for HARQ feedback (e.g., based on service type);

FIG. 16 is a flowchart illustrating a representative overwrite procedure;

FIG. 17 is a flowchart illustrating a representative procedure to avoid anticipated collisions;

DETAILED DESCRIPTION

Example Networks for Implementation of the Embodiments

Figure 1A:
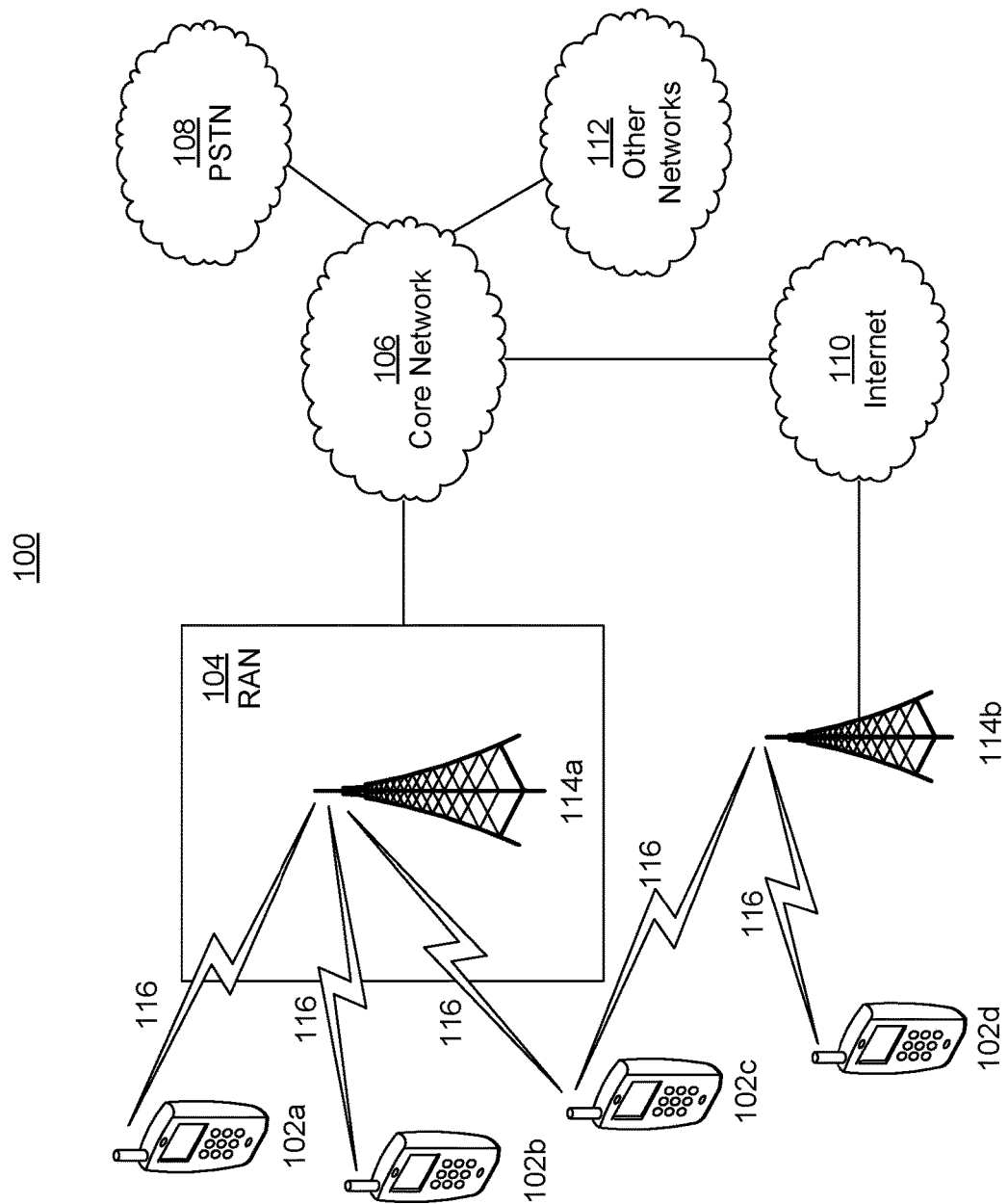
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an end and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
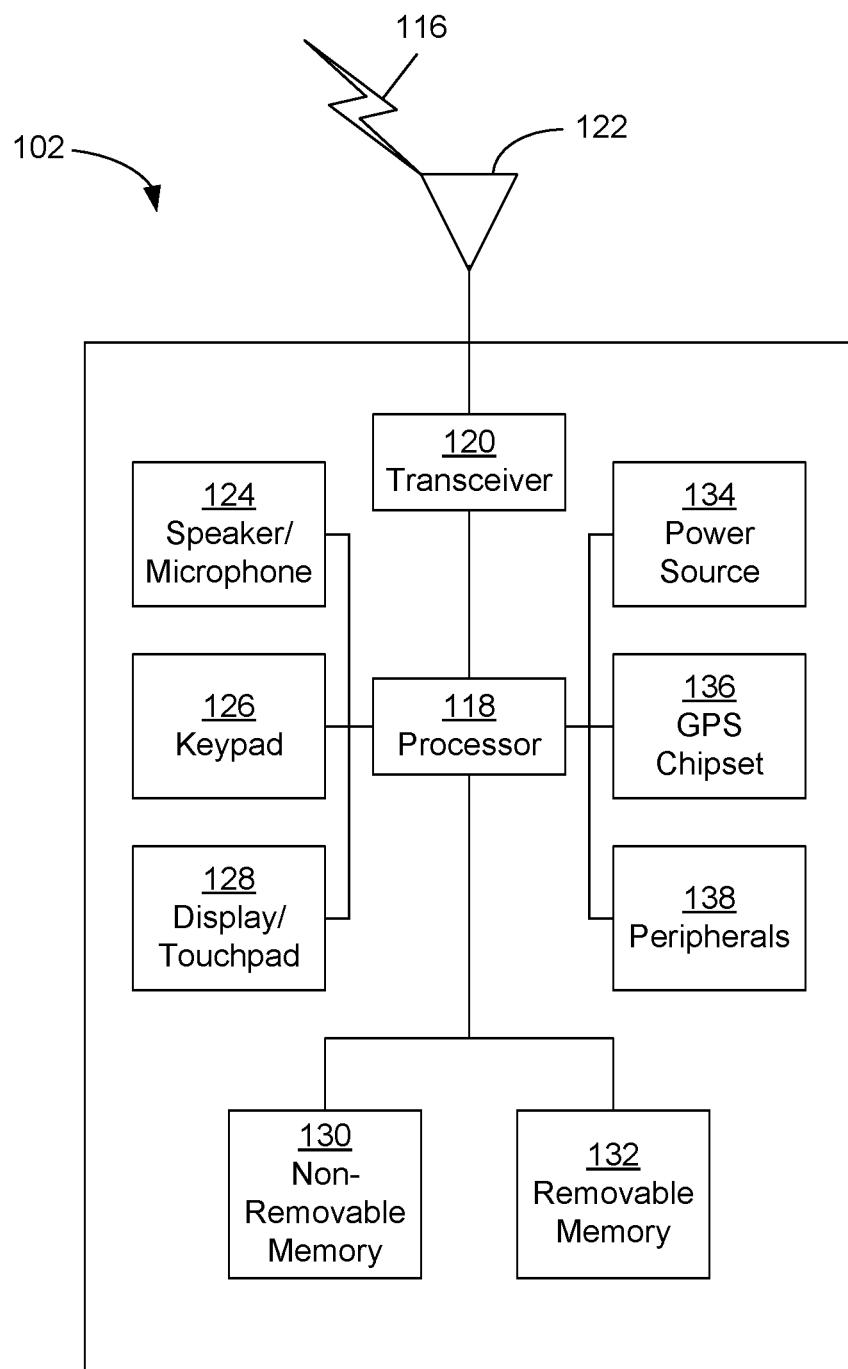
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
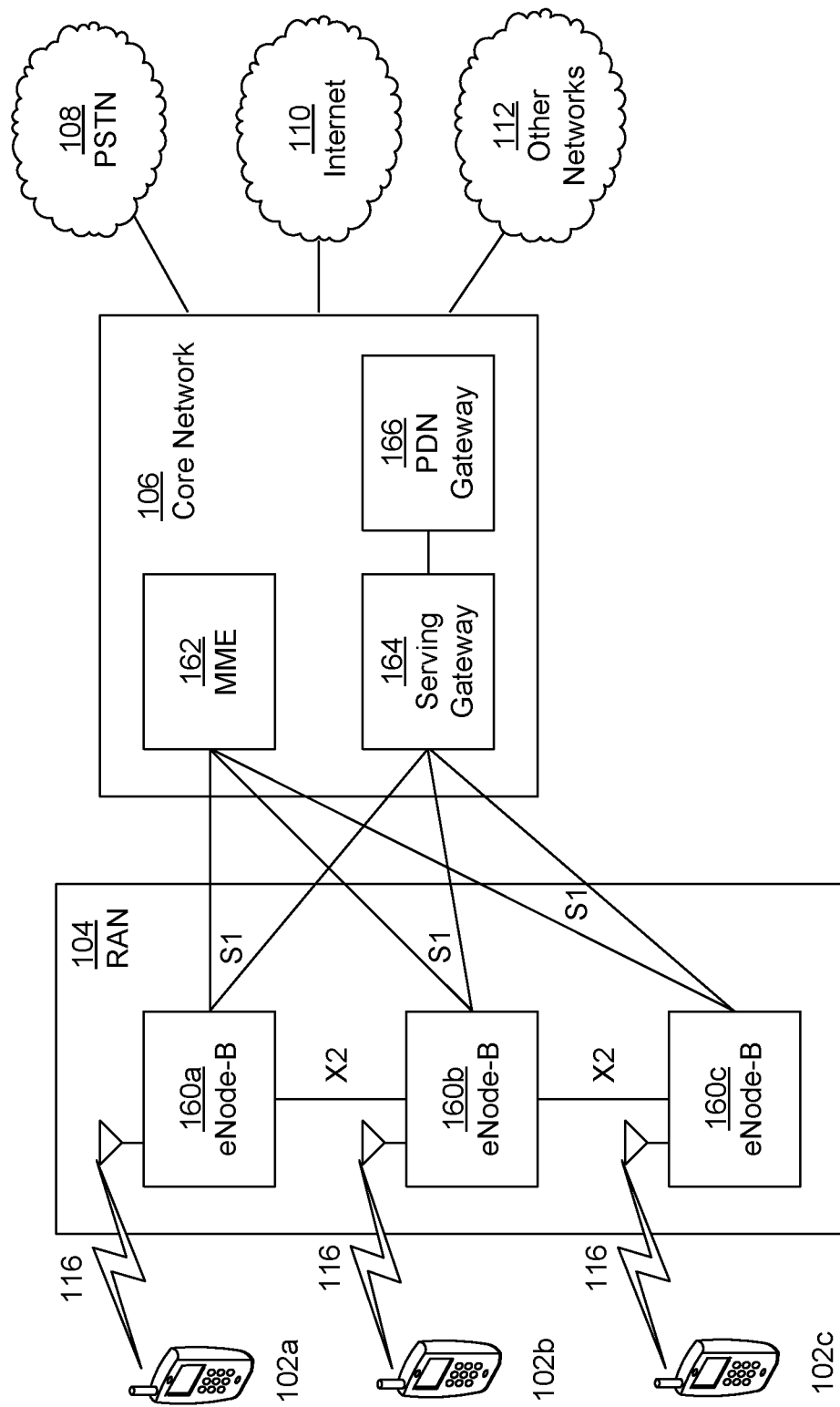
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 1C, the eNode Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily, or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
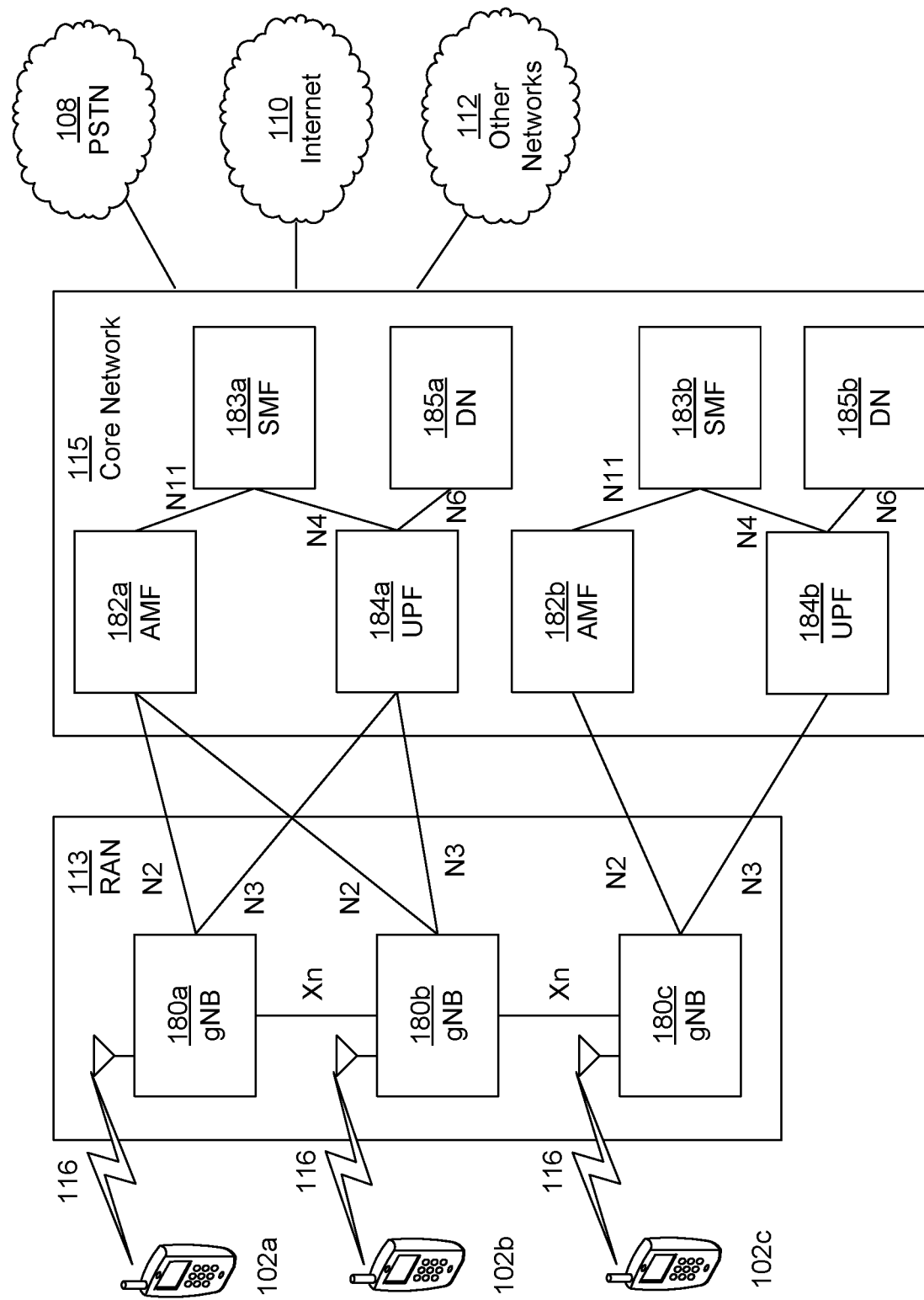
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology.

For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode Bs 160a, 160b, 160c. For example, WTRUs 102a, 102b, 102c may implement DC principles to communicate with one or more gNBs 180a, 180b, 180c and one or more eNode Bs 160a, 160b, 160c substantially simultaneously. In the non-standalone configuration, eNode Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator. The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of Non-Access Stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE/WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New Radio (NR) systems are expected to be deployed in 2020 and are to include both eMBB and URLLC types of service. These systems should support URLLC use cases with a BLER target of $10^{-5}$ and latency of 1.0 ms. 3GPP has started studying eURLLC with a BLER target up to $10^{-6}$ and a latency of 0.5 ms.

The requirements on data transmissions (a BLER of up to $10^{-6}$) and/or a short latency (on the order of 0.5 ms) can impact the reliability requirements of control signaling in both the downlink and/or the uplink. Having uplink control information messages with low reliability can impact the reliability of downlink and/or uplink data transmission. For example, unreliable HARQ-ACK feedback may result in high probability of NACK-to-ACK or NACK/ACK missed detection. NR Rel-15 control signaling was designed to support both eMBB and URLLC type of traffic. A WTRU 102 may multiplex the control signaling of different services having different latency and reliability requirements (e.g., services such as eURLLC, URLLC, eMBB and/or Massive machine type communication (mMTC) among others), within in the same control message, which may impact the latency and/or reliability of transmissions (e.g., the eURLLC transmissions). For example, multiplexing HARQ feedback of a URLLC with eMBB HARQ feedback, for example in long format PUCCH, may result in increasing the latency (e.g., instead of sending the low latency related HARQ feedback in the PUCCH over 2 symbols, it may be sent on the PUCCH over a larger set of symbols (e.g., 14 symbols)) which may make meeting the 0.5 ms latency requirement difficult.

In certain representative embodiments, apparatus, methods, procedures and/or operations may be implemented to indicate to a WTRU 102 supporting different type of service to separate and/or how to separate the control signaling for each type of service. A type of service generally refers to requirements of a given transmission, for example including latency, reliability, and/or priority, among others.

In certain representative embodiments, a WTRU 102 may interpret the control signaling based on a type of service.

In certain representative embodiments, apparatus, methods, procedures and/or operations may be implemented to determine by a WTRU 102 when and how to interpret the control signaling. For example, a WTRU 102 may be configured to interpret the downlink control information bitfields based on a control channel configuration. The control channel configuration may include: (1) a search space monitoring pattern (e.g., within a slot); (2) a search space periodicity; and/or (3) a search space duration; among others.

In addition to or in lieu the use of a control channel configuration, the WTRU 102 may be configured to interpret a set of downlink control information (DCI) bitfields based on one or more value of another set or other sets of DCI bitfields.

Figure 2:
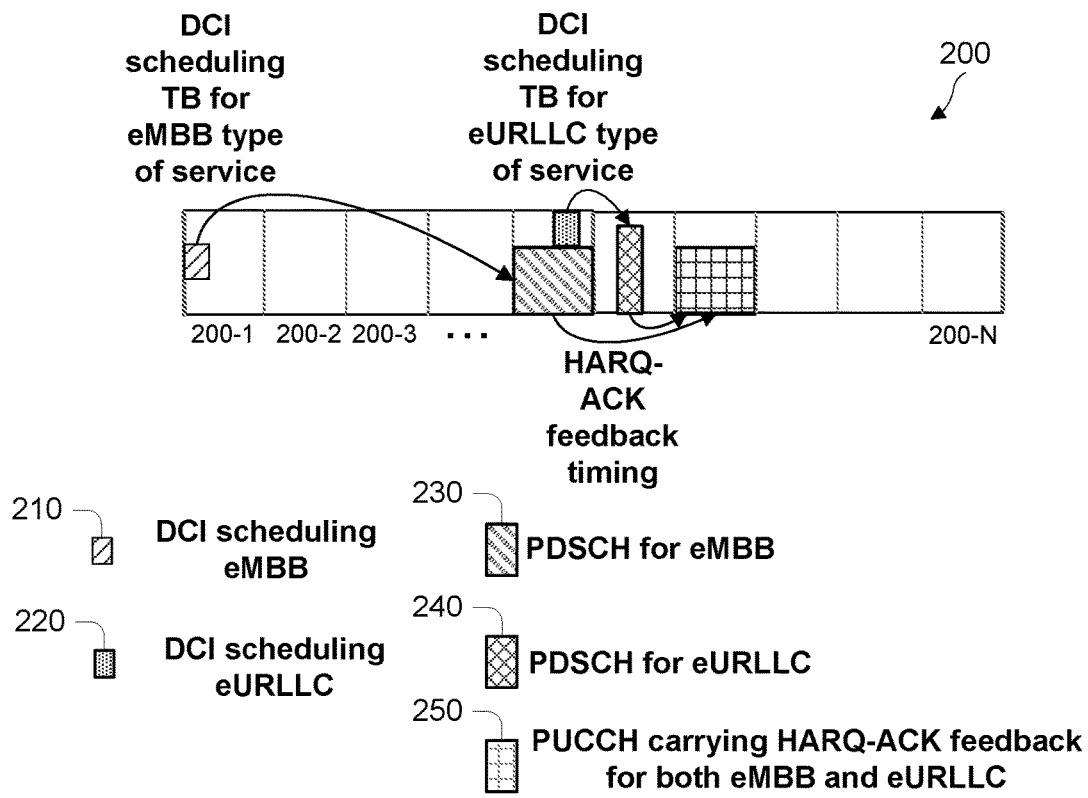
FIG. 2 is a diagram illustrating time-frequency resources used to carry control signaling for an Ultra Reliable Low Latency Communication (URLS)/enhanced URLLC (eU-RLLC) service and an enhanced Mobile Broadband (eMBB) service.

FIG. 2 is a diagram illustrating time-frequency resources used to carry control signaling for a URLLC/eURLLC service and an eMBB service. Referring to FIG. 2, a plurality of time-frequency resources 200-1, 200-2 . . . 200-N may carry control signaling for a plurality of services (e.g., control DCI scheduling for eMBB 210, DCI scheduling for URLLC service/eURLLC service 220, PDSCH for eMBB 230, PDSCH for URLLC service/eURLLC service 240 and PUCCH carrying HARQ-ACK feedback 250, among others. The time-frequency resources 200 may separately carry DCI scheduling for the eMBB service 210 and DCI scheduling for eURLLC service 220 and may separately carry PDSCH for the eMBB service 230 and PDSCH for the URLLC/eURLLC service 240. HARQ-ACK feedback for the eMBB service and for the URLLC/eURLLC service 250 may be multiplexed together and carried over the PUCCH. In certain representative embodiments, the HARQ-ACK feedback for the eMBB and eURLLC services may be separately carried over PUCCHs.

Figure 3:
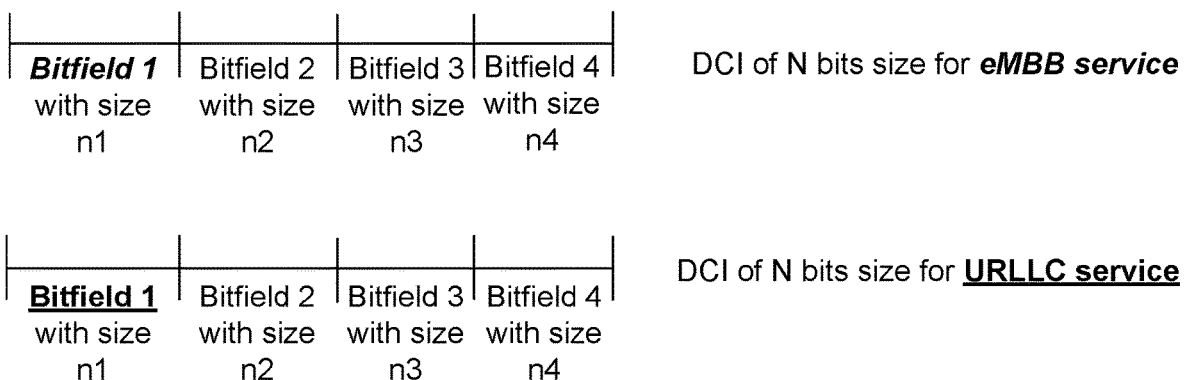
FIG. 3 is a diagram illustrating representative sets of bitfields used for eMBB service or URLLC/eURLLC service.
Figure 4:
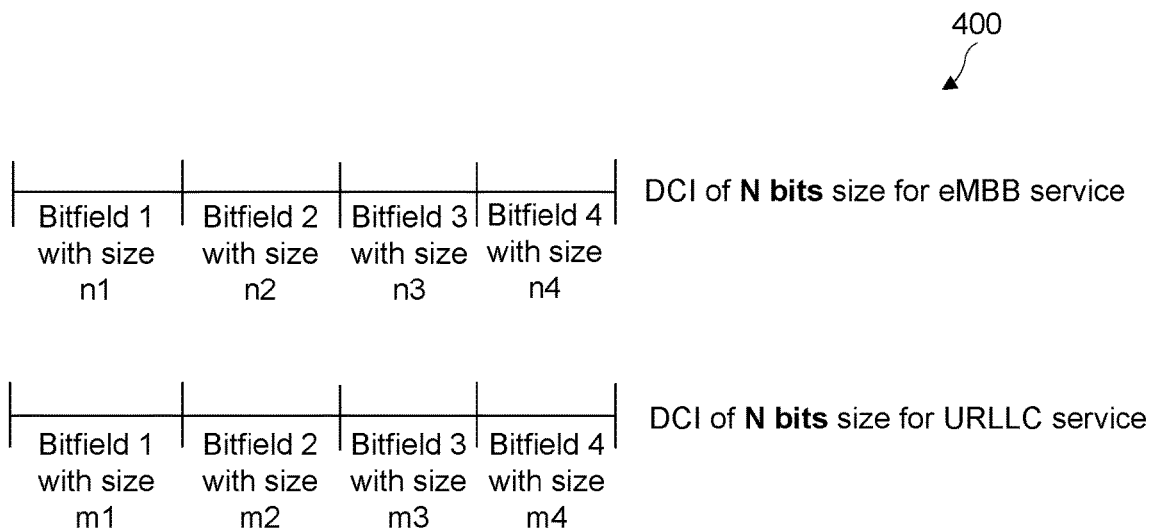
FIG. 4 is a diagram illustrating other representative sets of bitfields used for eMBB service or URLLC/eURLLC service.

FIGS. 3 and 4 are diagrams illustrating a representative set of bitfields (e.g., 4 bitfields). used for eMBB service or URLLC/eURLLC service. In FIG. 3, the bitfields (e.g., Bitfield 1-4) associated with a first service type (e.g., an URLLC/eURLLC service) are the same size as the corresponding bitfields (e.g., Bitfield 1-4) associated with a second service type (e.g., an eMBB service). In FIG. 4, the bitfields (e.g., Bitfield 1-4) associated with the first service type (e.g., the URLLC/eURLLC service) are not the same size as the corresponding bitfields (e.g., Bitfield 1-4) associated with the second service type (e.g., the eMBB service).

Referring to FIGS. 3 and 4, when a first service type (e.g., a URLLC/eURLLC service type) is determined by the WTRU 102, Bitfield 1 may be interpreted in a first manner and when a second service type (e.g., eMBB service type) is determined by the WTRU 102, Bitfield 1 may be interpreted in a second manner. Bitfields 2-4 may be interpreted in the same manner for both the first and second types of service. For example, a WTRU 102 may be configured to interpret a control information bitfield differently depending on a type of service being scheduled. Interpreting a DCI bitfield differently may mean that for the same value of a bit field, a WTRU 102 may interpret the control information differently. For example, a "000" value of a HARQ timing bitfield may indicate a first time value $t_1$ for a first service type (e.g., for a URLLC/eURLLC type of service and a second time value $t_2$ for a second service type (e.g., an eMBB type of service). A WTRU 102 may be configured to interpret differently one bitfield, a subset of the bitfields (e.g., only a subset of the bitfields for example as shown by Bitfield 1 in FIGS. 3 and 4) or all of the bitfields within the DCI. As shown in FIGS. 3 and 4, Bitfield 1 (e.g., only Bitfield 1) is to be interpreted differently. For example, when and/or how a WTRU 102 may interpret control signaling based on the type of service is disclosed herein.

Although only Bitfield 1 is shown in FIGS. 3 and 4 as being interpreted differently for different types of service, any number of bitfield may be interpreted differently for different types of service.

Although Bitfield 1 is shown as being interpreted differently for different types of service, any bitfield (Bitfield 1 or any other bitfields) may be interpreted differently for different types of service.

Representative Triggers for Different Interpretation of Control Signaling Fields In certain representative embodiments, downlink and/or uplink control interpretations may be based the control channels configurations.

In some embodiments, a WTRU 102 may be configured with one DCI size to monitor downlink control signaling for different type of services (e.g., a WTRU 102 may be configured to determine/interpret the DCI fields based on the control channel configuration on which the DCI was received. For example, as shown in FIGS. 3 and 4, a WTRU 102 may be configured with one DCI size to monitor various services (e.g., two services eMBB and URLLC) and the services (e.g., each service) may have a different bitfield configuration. For example, a WTRU 102 may be configured to interpret the DCI fields based on the control channel configuration on which the DCI was received. A WTRU 102 may be pre-configured/configured semi-statically (e.g., via network signaling and/or RRC signaling) with a sub-set of fields to be interpreted differently. For example, a WTRU 102 may be pre-configured to interpret (e.g., only interpret) the HARQ-ACK feedback timing field (e.g., bitfield) differently and the remaining fields may have the same interpretation regardless of which control channel configuration is being used. The control channel configuration may include any of:

(1) a search space configuration including any of:
  (i) monitoring periodicity and/or offset, such that for example a WTRU 102 may be configured with periodicity and/or offset threshold for which a bitfield in the DCI can be interpreted differently (for example, if the WTRU 102 is configured with a search space with monitoring periodicity greater than or equal to a threshold, the WTRU 102 may interpret the DCI fields received within that search space in a first manner or if the WTRU 102 is configured with a search space with monitoring periodicity less than the threshold, the WTRU 102 may interpret the DCI fields received within that search space in a second, different manner);
  (ii) search space duration such that for example, DCIs received by a WTRU 102 within a search space with a duration shorter than K slots may be interpreted differently than DCIs received within a search space with a duration longer than K slots;
  (iii) monitoring pattern within a slot such that for example, DCIs received by a WTRU 102 within a search space configured with a pattern of every symbol may be interpreted differently (for example, a WTRU 102 may be configured with a set of patterns and a DCI received within a search space that is configured with one or the set of those patterns may be interpreted differently from a DCI received within a search space that is not configured with one or the set of those patterns);
  (iv) search space index (for example, a WTRU 102 may be configured with a search space index for which one or more DCIs received by a WTRU 102 on this search spaces corresponding to the search space index may be interpreted differently); and/or
  (v) in case a PDCCH candidate belonging to more than one search space is successfully decoded, the WTRU 102 may determine the search space based on a priority index configured by higher layers for the search spaces (e.g., each search space), and/or based on another parameter associated to the one or more search spaces (for instance, the search space with a lowest periodicity) may be determined, among others;

(2) a CORESET configuration including any of:
  (i) a duration of the CORESET (e.g., the number of symbols (e.g., consecutive symbols) of the CORESET; and/or
  (ii) a control resource set index, among others;

(3) a RNTI used for scrambling a Cyclic Redundancy Check (CRC);

(4) a CRC length, for example the configuration may, for example include a 16-bit CRC, possibly for eMBB type of service, or a 24-bit CRC possibly for URLLC type of service; and/or (5) a Bandwidth Part (BWP) configuration, among others.

Representative Procedures for Downlink/Uplink Control Interpretation Based on Some DCI Values In certain representative embodiments, a WTRU 102 may be configured to interpret a set of DCI fields differently depending on the values of one or more other DCI fields. For example, a WTRU 102 may be configured with one field (e.g., bitfield) of DCI, a subset of fields of the DCI or all fields of the DCI to be interpreted differently, based on one or more other DCI fields (e.g., the bit value or values in particular DCI fields). A WTRU 102 can be configured with a given bitfield value (e.g., PDSCH time domain allocation) such that upon decoding this value, a WTRU 102 is triggered to interpret the set of bitfields differently. For example, a PDSCH time domain value that is below a threshold value or within a range of values may be interpreted by the WTRU 102 as indicating a particular type of service and/or may be used as an indication to interpret one or more other DCI fields in a particular manner (for example in a manner associated with a particular service type).

Representative Transmission Profile (TP) in DCI

In certain representative embodiments, the WTRU 102 may be configured with one or more TPs. For example, a first TP value may indicate a first (e.g., eMBB) type of service while a second TP value may indicate a second (e.g., URLLC) type of service. In such case, the WTRU 102 may receive a DCI and may determine a corresponding TP for the DCI. The WTRU 102 may interpret one or more fields of the DCI according to the determined value for the TP for the DCI (e.g., using a first value or set of values for a first specific TP value and a second value or set of values for a second specific TP value.

Representative Logical Channel Prioritization (LCP) for the Transport Block (TB) Corresponding to the DCI (e.g., which May Require and/or May Use eNB Blind Decoding)

In certain representative embodiments, the WTRU 102 may be configured with one or more Logical Channels (LCH). For example, a first LCH may be associated to data that corresponds to a first (e.g., eMBB) type of service and/or a second LCH may indicate a second (e.g., URLLC) type of service. The WTRU 102 may determine how to interpret at least some of the contents of a DCI as a function of the data to include in a corresponding transmission. For example, the WTRU 102 may determine a Transport Block (TB) size (TBS) for a transmission associated with the DCI. The WTRU 102 may determine what LCH to serve for the TB (e.g., based on a Logical Channel Prioritization (LCP) function). The WTRU 102 may determine the type of service associated with the concerned LCH. The WTRU 102 may interpret one or more fields of the DCI according to the determined type of service associated with the concerned LCH (e.g., using a first value or set of values for a first specific LCH configured for a first type of service or using a second value or set of values for a second specific LCH configured for a second type of service).

One of skill understands that the procedures/operations disclosed herein with regard to LCHs may be applied to Logical Channel Groups (LCG) in lieu of LCHs or in addition to LCHs. Similar procedures/operations may be applied using different sets of mapping restrictions, or TPs, for LCP. In such cases, the WTRU 102 may determine that the DCI schedules a new transmission, e.g., that the DCI toggles a New Data Indicator field (NDI). The WTRU 102 may determine that the interpretation of the HARQ PID corresponds to a first PID space for a first LCH, or to a second PID space for a second LCH (e.g., a different set of HARQ processes may be indicated as a function of the interpretation of the DCI). Proper reception of such transmission may require and/or use blind decoding at a network node (e.g., an eNB, or a gNB, among others).

Representative HARQ Process Identity (PID) in DCI

In certain representative embodiments, the WTRU 102 may be configured with one or more HARQ Process Identity (PID) spaces. For example, a first PID value may indicate a first (e.g., eMBB) type of service and/or a second PID value may indicate a second (e.g., URLLC) type of service. In such case, the WTRU 102 may receive a DCI for a HARQ transmissions and may determine the corresponding HARQ PID for the DCI. The WTRU 102 may interpret one or more fields of the DCI according to the determined value for the HARQ PID (e.g., using a first value or set of values for a first specific HARQ PID value (and/or a corresponding first value range) and a second value or set of values for a second specific HARQ PID value (and/or a corresponding second value range).

Representative Procedures for Downlink/Uplink Control Interpretation Based on Explicit Indication in the DCI In some embodiments, a WTRU 102 may be configured to interpret a set of DCI fields differently depending on a value of a bit in the DCI. For example, a WTRU 102 can be configured to determine the PUCCH resource for HARQ A/N feedback from a PUCCH resource set using "a set" indication in the DCI. In one example, a WTRU 102 may be configured to receive simultaneously eMBB and URLLC/eURLLC data transmissions. A WTRU 102 may be configured with at least two PUCCH resource sets each one corresponding to a type of service (e.g., URLLC/eURLLC, eMBB and/or mMTC). A WTRU 102 may determine the PUCCH resource set to which an acknowledgement (e.g., PUCCH) resource indicator (ARI) bitfield is pointing based on the set indication.

Different Interpretations of Representative Control Signaling Fields

Representative HARQ-ACK Feedback Timing Indication

Figure 5:
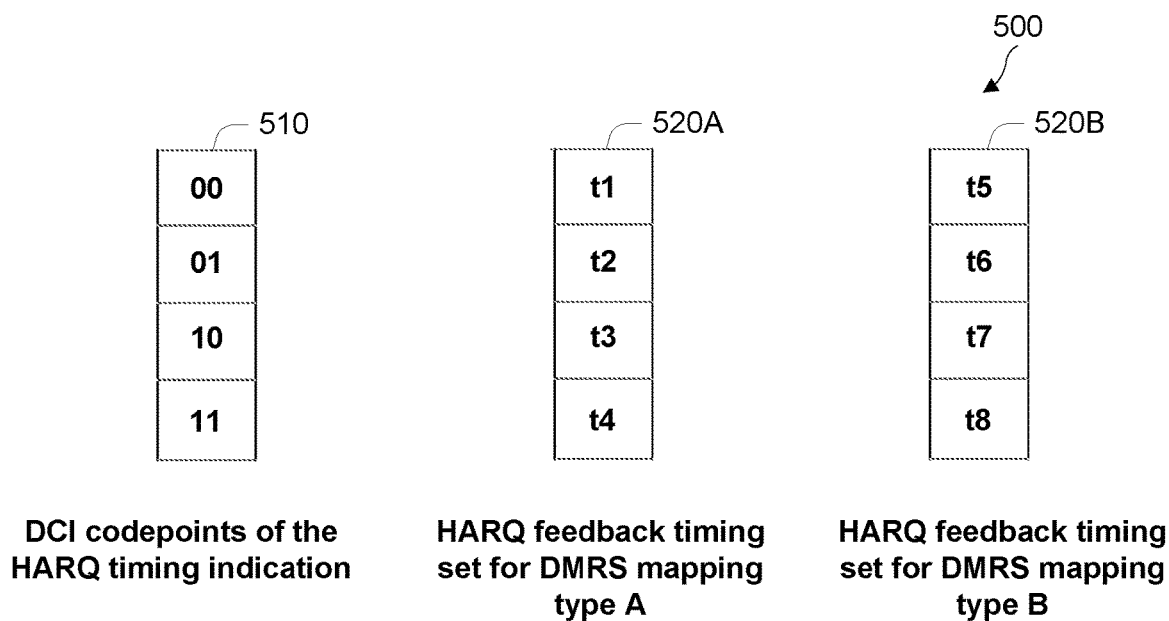
FIG. 5 is a diagram illustrating different HARQ feedback timings.

FIG. 5 is a diagram illustrating different HARQ feedback timings.

Referring to FIG. 5, a HARQ timing indication 510 may be signaled for example using system information, The HARQ timing indication 510 may indicate a HARQ timing associated with each of a plurality of HARQ feedback timing sets 520A, 520B ... 520N (e.g., for DMRS mapping type A 520A and for DMRS mapping type B 520B, among others). For example, the HARQ timing set 520A may include HARQ timings t1, t2, t3 and t4 and the HARQ timing set 520B may include HARQ timings t5, t6, t7 and t8. The HARQ timing indicator 510 may be a multibit indicator. For example, when this multibit indicator is set to a code point of "11", a HARQ feedback timing may be set to t4 for a DMRS type A and t8 for a DMRS type B.

A WTRU 102 may be configured semi-statically (e.g., using RRC signaling or via reception of a System Information Block (SIB)) with more than one sets of HARQ feedback timing values and each set may be configured with different timing (e.g., timing in different units). For example, a WTRU 102 may be configured with a first set of timing in units of slots, a second set of timing in units of symbols and a third set of timing in units of group of symbols. Each set of HARQ feedback timing values may correspond to an interpretation. For example, a first set of HARQ timing values may correspond to a specific PDSCH starting symbol. In certain representative embodiments, apparatus, methods, operations and/or procedures may be implemented for a WTRU 102 to dynamically determine the unit of HARQ feedback timing of a given transport block. One of skill in the art understands that these apparatus, methods, operations and/or procedures may be similarly applied for the interpretation of other DCI fields such as the PUCCH resource indicator (ARI).

A WTRU 102 may be configured to interpret the HARQ timing indication bitfield differently based on triggers described herein (e.g., based on a control channel configuration). A WTRU 102 may then determine the HARQ-ACK timing value based on the following bitfields values:

(1) a PDSCH time domain allocation value (for example, a WTRU 102 may interpret the HARQ feedback timing indication based on a PDSCH starting time and/or PDSCH duration values. The PDSCH time domain field may include any of:

(i) a k0 value which may indicate the slot scheduled for data transmission (e.g., a slot number n in which DCI is received and the data to be transmitted in slot n+k0) (for example, a WTRU 102 may be configured with a value of k0 for which the WTRU 102 may interpret differently the HARQ timing. In certain embodiments, a WTRU 102 may be configured with a k0 threshold value for which the HARQ-ACK timing may be interpreted differently. For example, when the k0 value is below the k0 threshold value, the HARQ-ACK timing may be interpreted in a first manner (for example based on symbol timing/symbol timing periods) and when the k0 value is at or above the k0 threshold value, the HARQ-ACK timing may be interpreted in a second manner (for example based on slot timing/slot timing periods);

(ii) a DMRS mapping type (e.g., a DMRS mapping type A or DMRS mapping type B) (for example, a WTRU 102 may be configured with two HARQ feedback timing sets and based on the DMRS mapping type indication in the DCI, a WTRU 102 may determine which HARQ timing set the HARQ timing indication is pointing to as shown in FIG. 5;

(iii) a start symbol and/or a length of the PDSCH transmission (for example, a WTRU 102 may be configured with a set of starting symbols (e.g., the last 3 symbols of a slot) such that if the WTRU 102 receives a PDSCH scheduling that starts at those symbols, the HARQ-ACK timing field may be interpreted differently. For example, if the WTRU 102 receives a PDSCH scheduling that starts at one of those symbols, the HARQ-ACK timing field may be interpreted in a first manner and if the WTRU 102 receives a PDSCH scheduling that does not start at any of those symbols, the HARQ-ACK timing field may be interpreted in a second manner); and/or (iv) an offset or a delay, in units of symbols, between reception of the PDCCH and the starting symbol of the PDSCH, among others; and/or (2) one or more HARQ process ID values (for example, a WTRU 102 may be configured with a set of HARQ process IDs for which the timing indication bitfield may be interpreted differently. For example, a WTRU 102 may be configured with HARQ ID 0, 1 and 2. Upon receiving a PDSCH assignment with HARQ ID {0,1, 2}, a WTRU 102 may interpret the HARQ-ACK timing field differently. A WTRU 102 may be configured semi-statically with a mapping between or among HARQ process IDs and a set of HARQ-ACK timings, among others.

Representative Procedures using HARQ Process Indication

A WTRU 102 may be configured to interpret the HARQ process ID indication in the DCI based on one or more triggers discussed herein (e.g., based on the control channel configuration and/or some DCI bitfields).

Representative Procedures using PUCCH Resource Indication for HARQ-ACK

A WTRU 102 may be configured to interpret the PUCCH resource indicator (ARI) based on the type of service being scheduled and/or based on any indication associated with the service type in accordance with one of the representative embodiments (e.g., solutions) described herein. For example, a WTRU 102 may be configured to send HARQ-ACK information in more than one PUCCH resources of the same slot and one PUCCH resource may contain and/or include a HARQ-ACK pertaining to a first set of PDSCH transmissions and a second PUCCH resource may contain and/or include another HARQ-ACK pertaining to a second set of PDSCH transmissions. The WTRU 102 may determine if a given PDSCH transmission belongs to the first set of PDSCH transmissions or the second set of PDSCH transmissions based on the type of service being scheduled and/or based on any indication associated with the service type in accordance with one of the representative embodiments (e.g., solutions) described herein. For example, the WTRU 102 may determine that a PDSCH transmission belongs to a first set of PDSCH transmissions if the PDSCH duration is below a threshold, and to a second set, otherwise.

Representative Procedures using PDSCH/PUSCH Time Domain Allocation Indication

A WTRU 102 may be configured to interpret the PDSCH and/or PUSCH time domain allocation indication based on one or more triggers described herein. For example, a WTRU 102 may be configured semi-statically with two sets of time domain allocations, each one corresponding to a type of service (e.g., URLLC/eURLLC and/or eMBB, among others). A WTRU 102 may be configured to interpret the time domain allocation bitfield in the DCI based on the control channel configuration on which the DCI scheduling downlink data or uplink data was received. A WTRU 102 may receive a semi-static mapping configuration between a control channel configuration and a set of time domain allocation.

Representative Procedures Supporting multiple PUCCHs Per Slot

Figure 6:
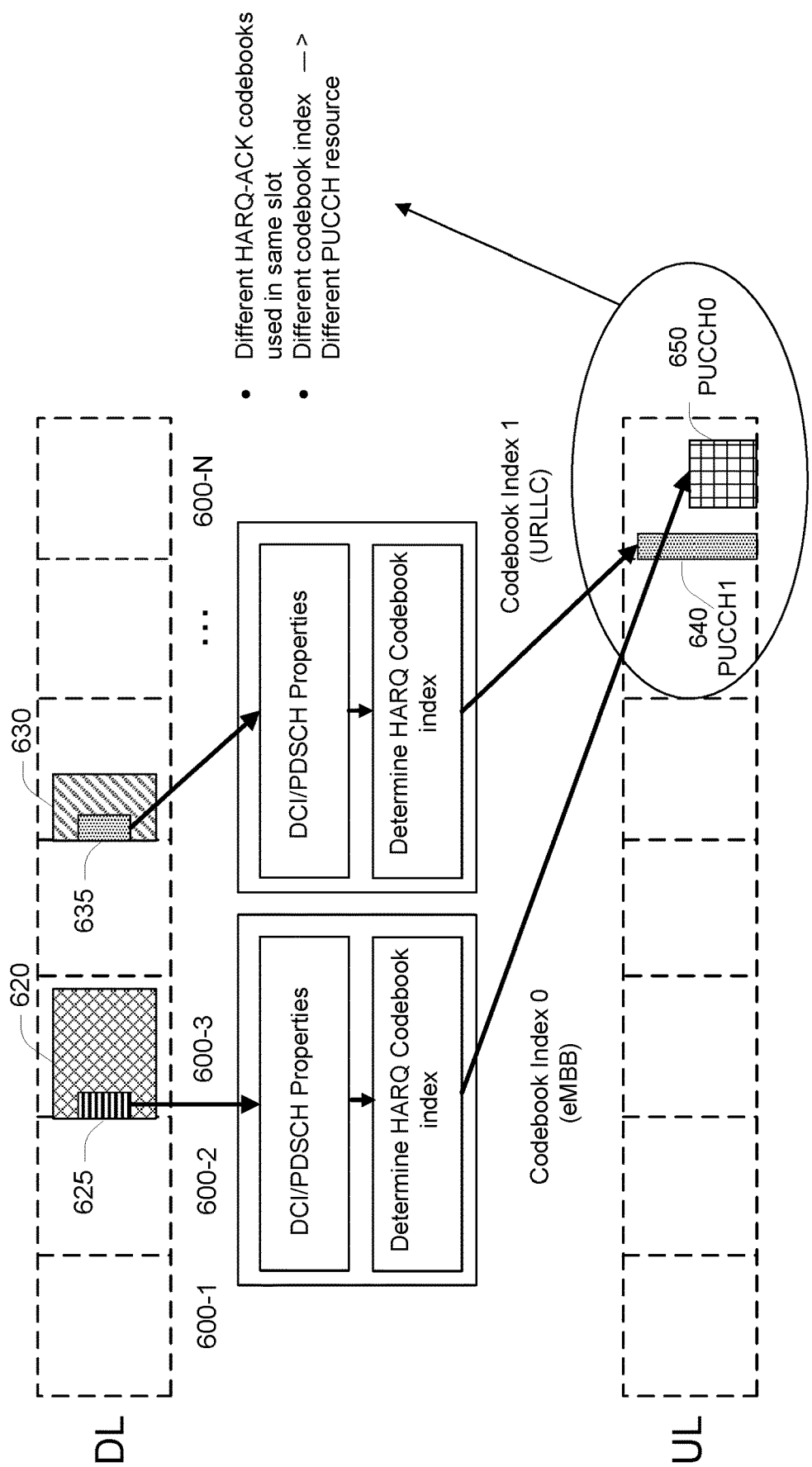
FIG. 6 is a diagram illustrating a representative procedure using feedback information (e.g., HARQ codebook acknowledgement indexes (HCAIs))

FIG. 6 is a diagram illustrating procedures supporting multiple PUCCHs per Slot.

Referring to FIG. 6, a WTRU 102 may receive a first PDSCH 620/DCI 625 for example associated with a first type of service (e.g., an eMBB service) in a slot 600-3 and a second PDSCH 630/DCI 635, for example associated with a second type of service (e.g., a URLLC/eURLLC service or mMTC service). The WTRU 102 may determine from the first PDSCH 620/DCI 625 a first codebook index 0 for HARQ feedback timing for the PDSCH 625 on the uplink and a second codebook index 1 for the for HARQ feedback timing for the PDSCH 630 on the uplink. When the HARQ feedback associated with different services (e.g., URLLC and eMBB) are to occur within the same slot 600N for the uplink, the WTRU 102 may generate for the uplink a first PUCCH 640 (e.g., PUCCH1 associated with the URLLC service) and a second PUCCH 650 (e.g., PUCCH0 associated with the eMBB service). For example, the WTRU 102 may determine that codebook index 0 is indicated for the HARQ feedback timing associated with the PDSCH 620 and that codebook index 1 is indicated for the HARQ feedback timing associated with the PDSCH 630. In such a scenario, when different codebook indexes (e.g., codebook indexes 0 and 1) may be indicated, multiple PUCCHs 640 and 650 may be generated in the same slot 600-N.

Although HARQ feedback for a plurality of services is shown to occur in one slot, other scenarios are possible. For example, HARQ feedback for a given service can occur in one slot without having HARQ feedback from any other service (e.g., any other codebook) requested in the same slot (e.g., a first HARQ feedback may correspond to a first slot and a second HARQ feedback may correspond to a second, different slot). In such a scenario, two codebooks may be indicated in two different slots.

In certain representative embodiments, a WTRU 102 may indicated for more than one PUCCH resource for the same slot 600-N, the same sub-slot or the same symbol from multiple DCIs that may be indicating downlink assignments or SPS release (e.g., using DCI format 1_0 or 1_1). The WTRU 102 may determine that a PUCCH 640 or 650 is transmitted for at least one PUCCH resource in the slot 600-N, sub-slot, or symbol where the at least one PUCCH resource is determined based on at least one index (codebook index 0 or 1. The index may be referred to as a codebook index herein. Each of the at least one PUCCH resource may correspond to a codebook index corresponding to at least one of the DCIs. For the received codebook index (e.g., each received codebook index (e.g., codebook index 0 or 1), the PUCCH resource may be determined from a PUCCH resource indicator field in a last DCI, among all DCIs that correspond to the codebook index (e.g., codebook index 0 or 1) and where the DCIs may be ordered according to a legacy procedure/operation (e.g., may be set in an ascending order across serving cell indexes and then an ascending order across PDCCH monitoring occasion indexes).

The codebook index 0 or 1 corresponding to a DCI may be determined according to any of:

(1) an additional field of a DCI explicitly indicating the codebook index;

(2) a property of the corresponding PDCCH, such as a TP, a search space, a search space periodicity, and/or a RNTI, among others; and/or (3) from an existing field of a DCI, such as a PUCCH resource indicator (for example, a codebook index may be mapped to values of the PUCCH resource indicator (e.g., each of the 16 possible values of the PUCCH resource indicator) and the mapping may be pre-determined, signaled and/or configured by higher layers, among others.

Following the determination of the at least one PUCCH resource in the slot, sub-slot, or symbol, the WTRU 102 may determine that there is an overlap in time and/or frequency domains for at least two resources. The WTRU 102 may prioritize one of the overlapping PUCCH resources and/or may drop the other overlapping PUCCH resource (at least one the overlapping portion) based on any of:
(1) a property of the PUCCH resources (for example, the WTRU 102 may drop the PUCCH resources that has a longest duration);
(2) a PUCCH format for the PUCCH resource (e.g., each PUCCH resource), using a pre-defined priority order between PUCCH formats;
(3) a Codebook index (e.g., to prioritize based on a lowest codebook index or a highest codebook index associated to the PUCCH resource)
(4) a TP;
(5) a property of the PDSCH transmissions associated to the PUCCH resource (e.g., each PUCCH resource) (for example, the WTRU 102 may drop the PUCCH resource carrying the HARQ-ACK of the PDSCH of longest duration); and/or
(6) a property of the corresponding PDCCH (for example, the WTRU 102 may drop the PUCCH resource carrying the HARQ-ACK of downlink assignments received from the PDCCH with a search space of a longest periodicity, or based on the RNTI, among others.

Although two HARQ codebook indexes (e.g., HARQ codebook indexes 0 and 1) are shown, any number of HARQ codebook indexes are possible. For example, a respective HARQ codebook index may correspond to a priority level, a priority, a type of service and/or a type of application and/or may be based on predetermined HARQ formats and/or HARQ bundling, among others.

Representative Procedures for Handling Collisions Between UCI or Data Associated to Different Services In certain representative embodiments, methods, apparatus, and systems may be implemented to handle collisions between UCI of different types and service-based on priority levels.

In certain representative embodiments, a WTRU 102 may handle situations where transmissions carrying uplink control information (UCI) and/or data associated to different services (e.g., for URLLC and/or for eMBB) may or would overlap such that latency and/or reliability requirements of each service are satisfied.

Representative Procedures for Identification of Service-Related Priority

The WTRU 102 may determine a priority associated with the data or the uplink control information (e.g., a service-related priority and/or a transmission profile) for at least one of the following:
(1) for data, a logical channel (LCH), and/or a logical channel group (LCG) from which the data is transmitted (for example, the WTRU 102 may determine the priority of a given PUSCH transmission as the RRC-configured LCH priority of the highest priority LCH mapped to the PDU carried by the PUSCH transmission;
(2) for a scheduling request (SR), a logical channel and/or a logical channel group of the data that triggered SR;
(3) for a physical random access channel (PRACH), a pre-defined priority such as a lowest priority and/or a highest priority; the event initiating the random access procedure (e.g. a handover, a re-establishment, a beam failure recovery, a scheduling request, and/or a PDCCH order, etc.); whether the random access procedure is contention-based or contention-free; whether PRACH is transmitted on a PCell or an SCell; whether the random access procedure is a prioritized random access procedure; for example, the WTRU 102 may determine a highest priority level for a PRACH in case of a prioritized random access procedure, and a lowest priority level, otherwise; in case of a random access procedure initiated by a scheduling request, a logical channel or a logical channel group of the data that triggered the SR; in case of a random access procedure initiated when the SR counter exceeds a maximum, the priority of the last SR resource transmitted; in case of a random access procedure initiated when no valid PUCCH resource is configured for a pending SR, the priority may be a lowest priority;
(4) for SRS, as a function of whether the SRS is periodic or triggered by a PDCCH; in the former case, the priority may be a lowest priority; in the latter case, the SRS may have a priority determined from the PDCCH;
(5) for a HARQ-ACK, whether slot-based or sub-slot-based HARQ feedback procedure is used;
(6) for a PUSCH, a WTRU 102 processing capability for a PUSCH preparation, for example where such capability may be associated to the PUSCH transmission and/or configured for the carrier in which the PUSCH is transmitted;
(7) a property of a resource configured for (or associated to) the transmission of data and/or the UCI. For example, the property may include:
  (i) a duration and/or a format of the PUCCH configured and/or indicated for the transmission of a SR or a HARQ-ACK, and/or a duration of PUSCH configured or indicated for the transmission of data or UCI, (e.g., the service-related priority may be a first value if the duration of the PUSCH and/or the PUCCH indicated by the configuration is higher than a threshold, and a second value if the PUSCH or the PUCCH has a duration lower than a threshold. In another example, the service-related priority may be a first value;
  (ii) a bandwidth part, a numerology (e.g., a sub-carrier spacing, a symbol duration), and/or a transmission configuration indication (TCI) state;
  (iii) a modulation and coding scheme (MCS) and/or a MCS table used for the transmission;
  (iv) a property used for determining a logical channel restriction for logical channel prioritization; and/or
  (v) a serving cell and/or an uplink carrier on which the transmission occurs, or whether the transmission takes place on a normal uplink or a supplementary uplink (SUL) carrier; among others;
(8) a configuration from higher layers (e.g. a RRC layer and/or a MAC layer, among others) such as any of:
  (i) an information element (IE) explicitly indicating a corresponding service-related priority; for example, the IE may be included as part of the SR resource configuration (for SR), as part of a resource configuration for link recovery request (LRR) or as part of the configured grant configuration (for data scheduled using configured grant);
  (ii) implicitly from a configuration aspect such as a periodicity, an offset, and/or a resource, (for example, the service-related priority for SR and/or for data scheduled using configured grant may be a first value if the periodicity is above a threshold, and a second value if the periodicity is below a threshold. In another example, the service-related priority for CSI may be determined from a BLER target configured for the CSI report setting;
  (iii) a mapping table between LCH priorities and priority levels (for example, the WTRU 102 may be configured by the RRC with a LCH priority quantization table, which may map a set of LCH priorities to a given priority level. For example, the priority of an SR and/or a PUSCH transmission may be determined differently when the SR and/or the PUSCH transmission conflicts with a HARQ-ACK. In certain embodiments, the MAC layer may pass a LCH priority associated with the SR and/or PUSCH transmission. The LCH priority may then be translated to a priority level that may be compared to the priority level attached to and/or associated with the HARQ-ACK (for example with the same granularity)); and/or (iv) the RRC may configure the WTRU 102 with a set of LCHs, as applicable for intra-WTRU prioritization (for example, the WTRU 102 may ignore a resource conflict, for example if the colliding transmissions do not involve at least one LCH applicable for intra-WTRU prioritization), among others;

(9) downlink control information (DCI) associated to the UCI and/or data and/or SRS such as any of:
  (i) for a HARQ-ACK, a DCI containing corresponding PDSCH scheduling information (e.g., in a dynamic assignment and/or an Semi-Persistent scheduling (SPS) activation);
  (ii) for data, a DCI containing corresponding PUSCH scheduling information;
  (iii) for CSI, a DCI triggering the transmission of the CSI; and from which the service-related priority, also applicable to the PDCCH carrying the DCI, may be determined by (a) a DCI format and/or DCI size, (b) a field explicitly indicating the service-related priority such as a priority indication, (c) implicitly from a value of a field; for example, the value of a radio network temporary identifier (RNTI) used to mask a CRC, and/or a size of a CRC, and/or (d) implicitly from a property of the PDCCH carrying the DCI such as a CORESET, whether the PDCCH is monitored at a beginning of a slot, a search space type, an identity and/or a monitoring period, for example, each search space may be explicitly configured with a service-related priority; a serving cell (e.g., in which the PDCCH is decoded and/or indicated by the DCI), a bandwidth part (e.g., in which PDCCH is decoded) (for example, a service-related priority index may be configured by RRC for a CORESET, a search space, a bandwidth part and/or a serving cell, among others).

(10) for HARQ-ACK, and/or the PDSCH associated to the HARQ_ACK, a property of the PDSCH for example:
  (i) a serving cell in which the PDSCH is decoded;
  (ii) a duration of the PDSCH;
  (iii) a bandwidth part in which the PDSCH is decoded;
  (iv) a WTRU processing capability associated to the PDSCH, and/or configured for the carrier in which the PDSCH is decoded;

(11) for data, the retransmission number of the transport block; and/or

(12) the WTRU PHY may determine the priority associated with a PUSCH and/or a SR transmission as a priority level indicated from one or more higher layers (e.g. the MAC layer), among others.

A service-related priority may be associated with at least one of the following parameters, (for example for the transmission of the UCI or data): (1) a maximum latency; (2) a maximum code rate and/or MCS; (3) a maximum duration for a single transmission; and/or (4) a maximum payload, among others.

At least some of the parameters may be implicitly determined from a configuration aspect. For example, a maximum latency for SR for a certain service-related priority may correspond to the periodicity of the SR transmission, and/or or while a maximum duration for a single transmission may correspond to the duration of a corresponding PUCCH resource.

For the PUSCH, a WTRU 102 may determine and/or consider a service-related priority for determining whether data from a logical channel may be included in one or more transport blocks. For example, the RRC may configure a set of allowed service-related priorities for each logical channel.

A service-related priority may determine a set of parameters used for power control (e.g., P0, alpha) and a power control adjustment state. For example, the set of parameters may apply to PUCCH resources for SR and/or LRR, depending on the priority configured by higher layers.

Representative Procedures for Identification of Collision Situation

A collision may occur when there is overlap in the time domain only, or in both time domain and frequency domain, between at least two transmissions dynamically indicated and/or configured.

A collision may occur when there is overlap in the time domain only if the transmissions are not allowed to take place simultaneously. For example, a collision may occur between a PUCCH and a PUSCH transmission in different serving cells for example in the same slot (e.g., overlapping in the time domain), if the PUCCH and the PUSCH are not allowed to be transmitted in the same slot (or to not overlap in the time domain). For example, a collision may occur between two PUSCH transmissions in the same slot and same serving cell if they overlap in the time domain (e.g., in the time domain only).

A collision may occur if there is insufficient processing time to process both transmissions (e.g., colliding transmissions), even in case there is no overlap in the time domain.

A collision may occur if the WTRU 102 determines that one or more transmissions should be performed, and the start of at least one transmission is less than a certain amount of time (e.g., time x), where time x may correspond to a configured value and/or to a processing time requirement from time the WTRU 102 determines that the transmission should be performed. The WTRU 102 may further consider for a data transmission in the set of colliding transmissions if the WTRU 102 has buffered data that can be mapped on the transmission, and/or if the data priority is higher than priorities of other transmissions in the overlapping set of resources. The WTRU 102 may further consider whether a LCH configured by the RRC, is worthy of intra-WTRU prioritization (e.g., by satisfying a criteria or rule), may or is to be included or associated with the transmission before considering the transmission, as a colliding transmission. For example, the WTRU 102 may ignore resource conflicts, if the colliding transmissions do not involve such LCHs (e.g., worthy LCHs).

For example, the WTRU 102 may be indicated a first resource for the transmission of the HARQ-ACK for a first service-related priority (e.g., for eMBB) and subsequently be indicated a second resource for the transmission of the HARQ-ACK for a second service-related priority (e.g., for URLLC), where the first and second resources overlap in the time domain.

In another example, the WTRU 102 may be indicated a first resource for the transmission of the PUSCH for a first service-related priority (e.g., for the eMBB) and subsequently be indicated a second resource for the transmission of the HARQ-ACK for a second service-related priority (e.g., for the URLLC), where the first and second resources overlap in the time domain.

In a further example, the WTRU 102 may be indicated a first resource for the transmission of the PUSCH for a first service-related priority (e.g., for the eMBB) and subsequently be indicated a second resource for the transmission of the PUSCH for a second service-related priority (e.g., for the URLLC), where the second PUSCH resource precedes the first PUSCH resource, and there may be insufficient processing time to process both of the PUSCHs.

In the following, the at least two resources are referred to as "colliding resources".

Representative Procedures for Actions Upon Identification of Collision

When a collision is identified for at least two colliding resources, at least one of the following actions may be taken:

The WTRU 102 may select at least one resource for transmission of a subset or all of the UCI and/or data that would have been transmitted over the colliding resources. In certain representative embodiments, resource selection may be implemented, for example as follows. The WTRU 102 may then not transmit (and possibly may stop or suspend an on-going transmission) on the remaining colliding resources at least over the overlapping portion in the time domain (or in both the time and the frequency domains). The WTRU 102 may transmit on at least one remaining colliding resource if the WTRU 102 is on a different serving cell, unless a restriction is configured or defined based on a type of physical channel (e.g., in case simultaneous PUCCH and PUSCH is not allowed).

The WTRU 102 may multiplex the UCI and/or data on at least one of the colliding resources. When multiplexing UCI and/or data over a selected resource, the WTRU 102 may follow a priority order. A priority of the UCI and/or data may be based on any of:

(1) a service-based priority (e.g., a priority indication); for example, using a numeric value (where a higher value may indicate higher priority, or, alternatively, a lower priority) or a label (e.g., URLLC, and/or eMBB, among others) with relative priority (URLLC>eMBB); and/or (2) a type of UCI and/or data (HARQ-ACK, SR, CSI, and/or data), including type of CSI report; for example, a SR and/or a HARQ-ACK may have highest priority, followed by data and CSI;

The criterion of service-based priority may have precedence over other criteria (e.g., the priority is determined first by service-based priority and second (in case of equality) by type of UCI/data). The overall priority can be determined using a formula. For example, the WTRU 102 may prioritize in the following order: URLLC SR/HARQ-ACK, URLLC data, eMBB SR/HARQ-ACK, eMBB data, and CSI. Example multiplexing implementation for UCI and/or data multiplexing are described as follows.

The WTRU 102 may multiplex certain (e.g., only certain) combinations of UCI and/or data on a selected resource according to pre-defined or configured rules, or according to a dynamic indication. The combinations (e.g., allowed combinations) may depend on the service-based priority level of UCI and/or data (e.g., each UCI or data) and on the type of resource (e.g. a PUCCH and/or a PUSCH) and/or a PUCCH format. For example, a WTRU 102 may multiplex (e.g., only multiplex) the UCI and/or the data associated to the same priority level, for example in the same resource. In another example, a WTRU 102 may multiplex (e.g., only multiplex) SR/HARQ-ACK of a same priority level into a PUCCH and/or a PUSCH. For example, a WTRU 102 may multiplex HARQ-ACK of a first priority level (e.g. for the URLLC) with data of a second priority level (e.g. for the eMBB) into a PUSCH, if such is indicated in the DCI, for example for the DL assignment corresponding to HARQ-ACK and/or for the UL grant corresponding to the PUSCH. In another example, the WTRU 102 may multiplex (e.g., only multiplex) CSI with HARQ-ACK and/or an SR associated to the lowest priority level.

The WTRU 102 may drop at least a subset of the UCI, SR and/or data. For example, the WTRU 102 may drop UCI and/or data which could not be multiplexed on the selected resource because of the UCI and/or data is not allowed to be multiplexed with UCI and/or data of higher priority. In another example, the WTRU 102 may drop UCI if it cannot be multiplexed on a resource, for example due to a payload and/or maximum code rate restriction. Dropping of a lower priority transmission may occur for any symbol starting later than a first minimum time Tdrop1 after the last symbol of a PDCCH indicating a high-priority UL transmission. In certain representative embodiments, dropping may be applied under a condition that the first symbol of the lower priority transmission is not before a second minimum time Tdrop2 after the last symbol of a PDCCH indicating a high-priority UL transmission.

In some embodiments, the WTRU 102 may process a subset of the UCI to reduce the number of information bits. For example, if HARQ-ACK is Code Block Group-based (CBG-based), the WTRU 102 may report (e.g., only report) TB-level HARQ-ACK. For example, HARQ-ACK information may be bundled (for example via an AND operation) in the time, frequency and/or space domain. The WTRU 102 may reduce the number of information bits for UCI of a priority level (e.g. the eMBB) depending on any of: (1) when it is a combination of UCI and/or data of a higher priority level on a certain resource; for example, in case HARQ-ACK of a first, higher priority level (e.g., for URLLC) is combined with HARQ-ACK of a second, lower priority level (e.g., for eMBB) on a PUCCH and/or a PUSCH, the number of HARQ-ACK bits of the second priority level may be reduced; (2) if it would not be possible to multiplex the UCI (together with other UCI or data of higher priority) due to a payload or maximum code rate restriction.

In some embodiments, the WTRU 102 may include a UCI multiplexing indicator in the resource to facilitate decoding of different UCI (e.g., possible UCI) combinations at a network side. The UCI multiplexing indicator may consist of a field of N bits, where value (e.g., each possible value) may indicate a combination (e.g., a specific combination) of UCI of different types and/or priority levels. For example, a first value may indicate that the UCI includes one or more HARQ-ACKs of a first priority level (e.g., a first priority level only), a second value may indicate that the UCI includes one or more HARQ-ACKs of a second priority level (e.g., a second priority level only), a third value may indicate that the UCI includes one or more HARQ-ACKs of first and second priority levels, a fourth value may indicate that the UCI includes an SR of a first priority level and one or more HARQ-ACKs of a second priority level, among others. The UCI multiplexing indicator may be encoded separately from other UCI and data and may be mapped on one or more resource elements (e.g., specific resource elements) of the resource.

In some embodiments, the WTRU 102 may determine a resource for transmission of a subset of the deprioritized UCI and/or data, for example, at a later point in time, e.g., referred to as an "overflow" resource in the following. Representative embodiment for the determination of an overflow resource are described herein.

The WTRU action upon determining a collision may depend on whether a conflicting PUSCH transmission has started, and/or whether a the PDU for the conflicting PUSCH resource has been generated and delivered to the HARQ process. The WTRU 102 may not generate a PDU in MAC (e.g., the MAC layer) for a grant that conflicts with another resource, if the WTRU 102 determines that the PDU may or is to be dropped at the physical layer. For example, if the WTRU 102 determines that a PUSCH transmission has lower priority than a conflicting SR and/or UCI transmission and the PUSCH transmission may or is to be dropped (e.g., completely dropped at the physical layer), the WTRU 102 may ignore the grant at the MAC layer and may not generate a PDU for the PUSCH resource. The WTRU 102 may consider whether the SR and/or UCI can be multiplexed on the lower priority PUSCH. For example, the WTRU 102 may ignore the grant at the MAC layer and may not generate a PDU for the PUSCH resource, if the SR and/or UCI cannot be multiplexed on the PUSCH transmission and the PDU may or is to be dropped at the physical layer. In another example, the MAC of the WTRU 102 may determine whether to instruct the physical layer to transmit an SR, for example if the WTRU 102 determines that the SR may not or is not to be dropped in the physical layer. For example, the WTRU 102 may determine to instruct the physical layer to transmit an SR of a lower priority (e.g., lower priority level) than an overlapping PUSCH transmission, if the SR and/or UCI—can be multiplexed on the PUSCH transmission. In certain representative embodiments, the WTRU MAC may not instruct the physical layer to generate an SR transmission, for example if the lower priority SR and/or UCI cannot be multiplexed on the higher priority PUSCH transmission.

For SR collisions vs. PUSCH collisions, the WTRU 102 may consider whether the WTRU 102 has signaled (e.g., already signaled) the same pending SR to the physical layer prior to instructing the physical layer again to transmit the same pending SR during the overlapping PUSCH. For example, the MAC (e.g., the MAC layer) of the WTRU 102 may not instruct the physical layer to transmit an SR during an overlapping PUSCH, if the WTRU 102 has signaled (e.g., already signaled) the pending SR to the physical layer and the SR has been multiplexed with the overlapping PUSCH. In certain representative embodiments, the WTRU 102 may drop the SR transmission at the physical layer, for example if the SR has been multiplexed (e.g., already multiplexed) on an overlapping PUSCH. In certain examples, the MAC (e.g., the MAC layer) of the WTRU 102 may not instruct the physical layer to transmit an SR during an overlapping PUSCH, if the WTRU 102 has signaled (e.g., already signaled) the pending SR and the WTRU 102 has suspended and/or punctured the PUSCH at the physical layer to transmit the SR.

Representative Procedures for Resource Selection (e.g., in General)

The WTRU 102 may select at least one of the colliding resources for transmission. The resource may be referred to as a "prioritized resource". The WTRU 102 may select a prioritized resource based on any of the following criteria: (1) the service-based priority associated to the resource, and/or associated to the UCI and/or data, for example configured to be transmitted on the resource; (2) whether the resource satisfies latency and/or reliability requirements of the highest priority UCI and/or data to be carried by the colliding resources; (3) whether transmission of the UCI and/or the data over the resource may or would result in an increase in the latency by more than a certain amount, for example for the highest priority UCI and/or data; (4) the type of: (1) physical channel (e.g., the PUSCH and/or the PUCCH); and/or (2) PUCCH format among others; (4) time-related properties of the resource such as a duration and a timing of first and last symbols (for example, the WTRU 102 may select a resource with a shortest duration among a set of suitable colliding resources); (5) whether transmission on the resource may use (e.g., may require) a transmission power exceeding a configured maximum power; (6) whether processing time is sufficient to multiplex the UCI and/or data over the prioritized resource; (7) the value of a certain UCI; for example, a resource for the SR may be selected if (e.g., only if) the corresponding value of the SR is negative; (8) the number of bits of UCI and/or data that can be multiplexed and/or transmitted using the resource, for example conditioned on following a priority order of the different UCI and/or data and/or (9) the carrier, serving cell, frequency band or whether the resource is on normal uplink or supplementary uplink.

Representative Procedures for Resource Selection (e.g., for PUCCH Resource Sets)

A WTRU 102 may be configured with more than one PUCCH resource set. The maximum payload of the resource set (e.g., each resource set) and the PUCCH resources within the set (e.g., each set) may be configured for service-based priority level (e.g., separately for each service-based priority level).

In an example, a resource set for a PUCCH associated to a priority level may be selected based on a number of UCI bits associated to that priority level (e.g., a number of UCI bits associated to that priority level only), or to priority levels equal to or lower than that priority level, across the colliding resources. For example, the number of UCI bits may include CSI regardless of the priority level.

In certain representative embodiments, a resource set for a PUCCH may be selected based on a total number of UCI bits across colliding resources regardless of the priority level.

Representative Procedures for Resource Selection Based on Suitability

In some embodiments, a resource may be selected if (e.g., only if) it is first determined to be "suitable" for the transmission of a combination of UCI and/or data, based on rules and/or conditions described herein. For example, the prioritized resource may be selected (e.g., only be selected) among a subset of colliding resources determined to be suitable.

For UCI and/or data (or one or more portions thereof) associated to certain service-based priority levels, a resource may be suitable (e.g., considered suitable only) if it is possible to multiplex the UCI and/or data under at least one condition. Suitability for a resource may be defined with respect to a specific combination of UCI and/or data. For example, a resource may be suitable (e.g., considered or determined to be suitable) for a first combination of UCI and/or data and not suitable for a second combination of UCI and/or data.

Representative Procedures for Suitability Related to Priority Level

A suitability condition may be related to a priority level associated to the resource. For example, a PUCCH resource indicated for the HARQ-ACK of a certain priority level may be suitable for including UCI associated to that priority level (e.g., the UCI associated to that priority level only), and/or to priority levels equal to or lower than that priority level.

Representative Procedures for Suitability Related to Latency

A suitability condition may be related to a latency requirement. A resource may be considered or determined to be suitable if (e.g., only if) the UCI and/or data (e.g., all of the UCI and/or data) may be mapped on resource elements in time symbols that occur before a certain threshold. The threshold may be determined from any of: (1) a duration, a start time and/or an end time of the colliding resource that may or is to carry the UCI and/or data (for example, if the HARQ-ACK and/or the SR may or is to be carried on a PUCCH resource, the threshold may correspond to the end of the last symbol of the PUCCH resource, plus an offset; and/or (2) a configuration aspect of the UCI and/or data; for example, a maximum time delay and/or offset may be explicitly configured by higher layers for the UCI and/or data, or may be determined from an aspect such as the periodicity of the SR configuration.

Representative Procedures for Suitability Related to Reliability

A suitability condition may be related to a reliability requirement. For example, a resource may be determined to be suitable if (e.g., only if) a number of coded modulation symbols per layer for the UCI (e.g. the HARQ-ACK and/or the SR) is mapped may be or is to be lower than a threshold. The threshold may be determined as a fraction of the total number of resource elements available for transmission of the UCI. The fraction may be configured by higher layers or dynamically indicated for the type of UCI and/or service-based priority level.

In another example, a suitability condition may be related to a maximum amount of puncturing applied to other UCI and/or data. For example, in case the HARQ-ACK and/or the SR of a certain priority level is mapped to the PUSCH by replacing (e.g., puncturing) modulation symbols that may have been used for data and/or other UCI, the WTRU 102 may determine that the resource is suitable if (e.g., only if) the fraction of modulation symbols available to data and/or other UCI that may be or is to be punctured is lower than a threshold. The threshold may be configured by higher layers or indicated for the type of UCI and/or the service-based priority level subject to puncturing.

In another example, a suitability condition may be that after multiplexing, the coding rate applicable to a certain UCI may be or is to be less than a threshold for the UCI type and/or priority-level. For example, a resource may be suitable for multiplexing the HARQ-ACK of first and second priority levels if (e.g., only if) the coding rate of the HARQ-ACK of a first priority level may not or is not to exceed a threshold. The threshold or maximum coding rate may be configured, for example separately for different priority levels. In another example, a suitability condition may be that the modulation order or spectrum efficiency applicable to a certain UCI or data is below a threshold.

In another example, a suitability condition may be that the total number of UCI (and/or data) bits is less than a maximum payload configured for the resource. In another example, a suitability condition may be that the UCI is mapped on certain subset of carriers, serving cells, frequency band, or whether it is on normal uplink or supplementary uplink.

In a further example, a suitability condition may be that the transmission power (e.g., required transmission power) may be or is to be below a threshold. In one example, the threshold may depend on a configured maximum power (Pcmax) applicable to the carrier and/or the WTRU 102. In another example, the threshold may be defined with respect to the transmission power that would be used/required to transmit the UCI and/or data over a colliding resource, for example if no multiplexing with UCI and/or data may or is to take place. For example, in case of a collision between a first resource for the HARQ-ACK of a first priority level and a second resource for the HARQ-ACK of a second priority level such that the first priority level may be higher than the second priority level, a resource may be determined to be suitable for multiplexing the HARQ-ACK of both priority levels, for example if the difference between the transmission power (e.g., the required transmission power) for the resource with multiplexing and the transmission power (e.g., the required transmission power) for the first resource with the HARQ-ACK of the first priority level (e.g., only HARQ-ACK of the first priority level) may be or is to be less than a threshold. The threshold may be configured by higher layer and/or indicated dynamically for the type of UCI and/or priority level.

Representative Procedures for Resource Selection Using Determined Prioritized Resources The WTRU 102 may determine the prioritized resource among a set of colliding resources based on any of the following.

The WTRU 102 may determine a prioritized resource as a resource suitable for the transmission of a maximum number of UCI and/or data bits of the highest priority level.

In case more than one resource meets this criterion, the WTRU 102 may determine a resource, among or between the more than one resources, that is suitable for the transmission of a maximum number of UCI and/or data bits of a next highest priority level, and so on. In certain representative embodiments or in case more than one resource remain after determining/considering all priority levels, the WTRU 102 may use other criteria to select one resource. For example, the WTRU 102 may select a resource that starts earliest in time, a resource that has a shortest duration, a resource that has a lowest transmission power requirement and/or a resource that has a lowest coding rate, modulation order and/or spectrum efficiency. In another example, the WTRU 102 may select a resource depending on the carrier, serving cell, whether the resource is on normal uplink or supplementary uplink, or the frequency band. The priority order may be configured by higher layers or pre-defined.

For example, there may be a collision between a first resource for HARQ-ACK (i.e. PUCCH) of a first service-based priority level (e.g. for the URLLC) and a second resource for data (e.g., on the PUSCH) of a second service-based priority level (e.g. for the eMBB), such that the first priority level may be higher than the second priority level. The WTRU 102 may select the second resource for multiplexing the HARQ-ACK of the URLLC and the data of the eMBB if the second resource starts later, and ends earlier, then the first resource, or earlier than the last symbol of the first resource plus an offset. For example, if the first resource is on the PUCCH for the HARQ-ACK for transmission in a certain sub-slot, the WTRU 102 may select the second resource for multiplexing the HARQ-ACK of the URLLC and the data of the eMBB, if the second resource is contained within the sub-slot in the time domain. Otherwise, the WTRU 102 may select the first resource for transmission of the HARQ-ACK of the URLLC (e.g., only the first resource for transmission of the HARQ-ACK of the URLLC).

For example, there may be a collision between a first resource for SR (e.g., the PUCCH) of a first service-based priority level (e.g., for the URLLC) and a second resource for the data (e.g., on the PUSCH) of a second service-based priority level (e.g., for the eMBB) such that the first priority level may be higher than the second priority level. The WTRU 102 may select the second resource for multiplexing the SR of the URLLC and the data of the eMBB, if the last symbol of the PUSCH, or the last symbols of the PUSCH mapping SR, are not more than X symbols after the last symbol of the first resource. X may be a function of the periodicity of the SR configuration (e.g., X may be half of the periodicity). Otherwise, the WTRU 102 may select the first resource, if SR is positive and the second resource if SR is negative. For example, the SR may be multiplexed in the PUSCH if (e.g., only if) the latency requirement above is satisfied.

Figure 7:
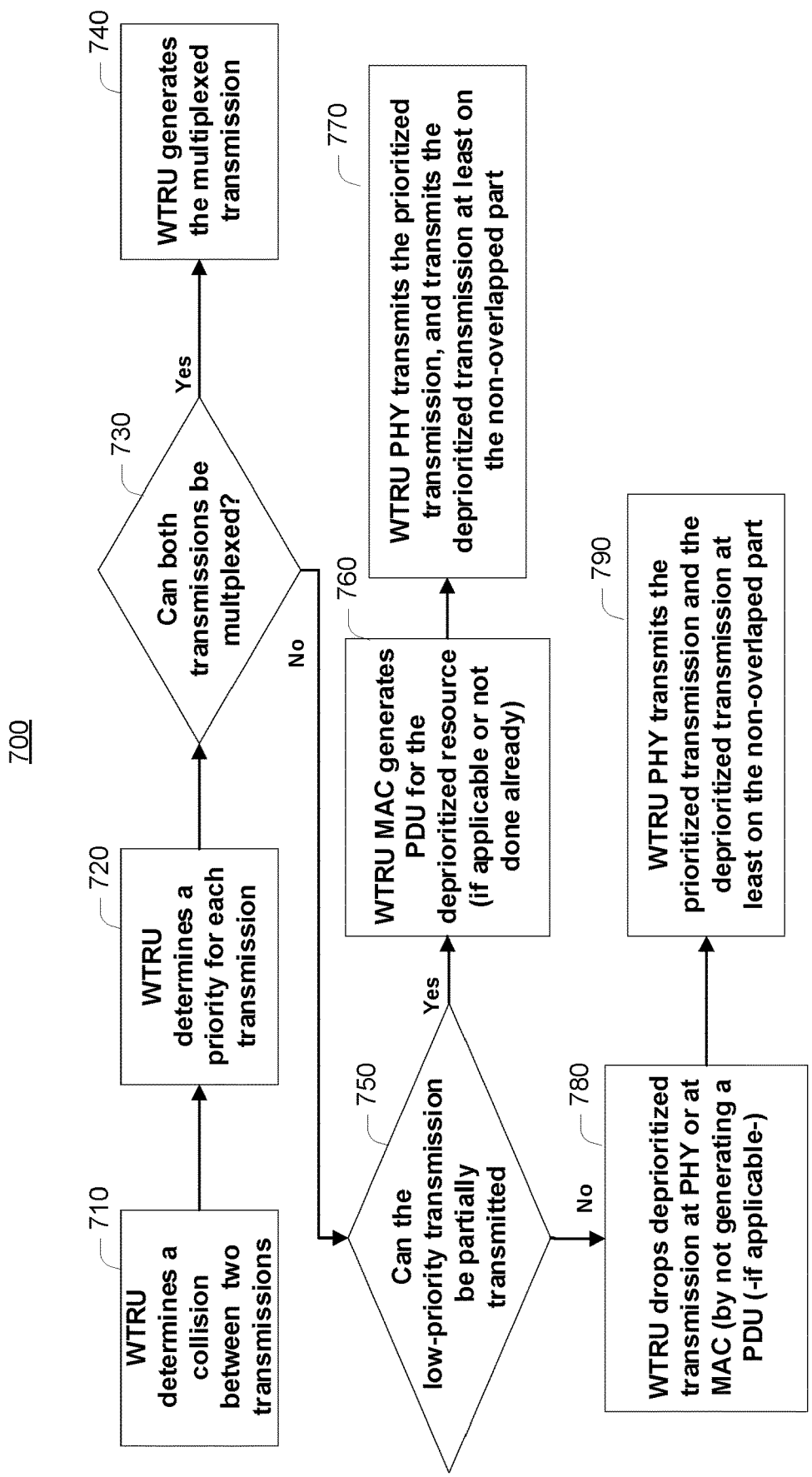
FIG. 7 is a diagram illustrating a representative transmission procedure after a collision determination.

FIG. 7 is a diagram illustrating a representative transmission procedure 700 after a collision determination.

Referring to FIG. 7, the transmission procedure 700 may include, at block 710, the WTRU 102 determining that a collision is anticipated between two transmissions (e.g., prior to the actual transmissions) and the WTRU 102 may follow a procedure involving any of the following (e.g., to prevent the anticipated collision):

(1) at block 720, the WTRU 102 may determine a priority for each colliding transmission;

(2) at block 730, the WTRU 102 may determine whether the lower-priority transmission can be multiplexed with the prioritized transmission. After this determination whether the lower-priority transmission can be multiplexed with the prioritized transmission, the WTRU 102 may:

(i) if the WTRU 102 determines that the lower-priority transmission can be multiplexed with the prioritized transmission (e.g., if yes), at block 740, the WTRU 102 may generate the multiplexed transmission, including a PDU, for example if applicable; or (ii) if the WTRU 102 determines that the lower-priority transmission cannot be multiplexed with the prioritized transmission (e.g., if no), at block 750, the WTRU 102 may determine whether the deprioritized transmission can be partially transmitted (e.g., at least on a non-overlapping part). After this determination whether the deprioritized transmission can be partially transmitted, the WTRU 102 may:

(a) if the WTRU 102 determines that the deprioritized transmission can be partially transmitted (e.g., if yes), at blocks 760 and 770, the MAC (e.g., the MAC layer) may generate a PDU for the deprioritized resource (e.g., if applicable and/or if not generated already) and the PHY (e.g., the physical layer) of the WTRU 102 may transmit the deprioritized transmission at least on the non-overlapping part; or (b) if the WTRU 102 determines that the deprioritized transmission cannot be partially transmitted (e.g., if no), at blocks 780 and 790, the WTRU 102 may drop the deprioritized transmission at the physical layer and/or may refrain from generating/constructing a PDU (e.g., if applicable) on the associated resource and the PHY (e.g., the physical layer) of the WTRU 102 may transmit the deprioritized transmission at least on the non-overlapping part.

When the WTRU 102 determines a conflict (and/or collision) among more than two transmissions, the WTRU 102 may follow the same process on a pairwise basis upon ranking the conflicting transmissions by priority. In certain representative embodiments, the WTRU 102 may rank the conflicting transmissions by priority and may perform intra-WTRU prioritization to a subset of the conflicting transmissions (e.g., a subset of the highest ranked conflicting transmissions such as only to the top x conflicting transmissions, where x is configured, signaled and/or pre-determined). The WTRU 102 may drop the remaining transmissions. In certain examples, the WTRU 102 may rank the transmissions per type (PUSCH, UCI, or SR), and may keep and/or maintain the top priority transmission per type (e.g., only the top priority transmission per type) prior to running/executing the prioritization process. The WTRU 102 may drop the remaining lower priority (e.g., non-top priority) transmissions for each type. The WTRU 102 may multiplex UCIs (e.g., HARQ-ACKs) together using legacy rules prior to comparing their priority to other conflicting transmissions.

In certain representative embodiments, methods, apparatus, and systems may be implemented to handle PUSCH vs UCI/SR prioritization, including interactions with the MAC layer.

Figure 8:
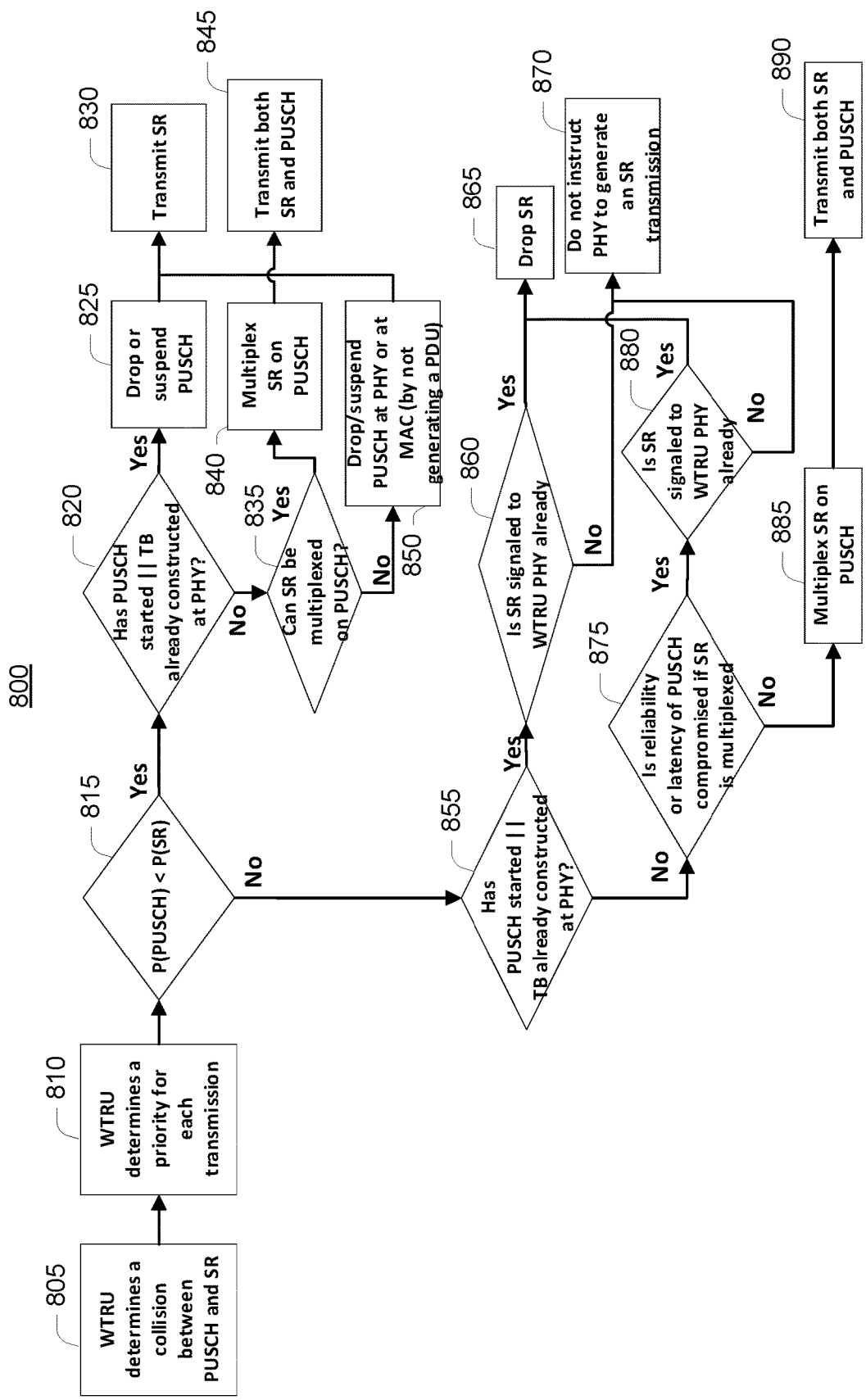
FIG. 8 is a diagram illustrating a representative intra-WTRU prioritization process.

FIG. 8 is a diagram illustrating a representative intra-WTRU prioritization procedure.

Referring the FIG. 8, the representative intra-WTRU prioritization procedure 800 may include the WTRU 102 determining whether a collision (e.g., a PUSCH vs. SR collision) is anticipated to occur and whether action is to be initiated to prevent/mitigate the collision. For example, based on certain criteria, conditions and/or rules, the WTRU 102 may: (1) transmit the SR (e.g., by dropping or suspending the PUSCH for example at the physical layer); (2) transmit the SR and PUSCH (e.g., by multiplexing the SR on the PUSCH); (3) transmit the SR (e.g., by dropping or suspending the PUSCH, for example at the MAC layer by not generating the corresponding PDU or PDUs) (4) drop the SR (e.g., if the SR is signaled to the physical layer); and/or (5) not generate and SR transmission (e.g., if the SR is not signaled to the physical layer).

For example, at block 805, the WTRU 102 may determine whether a collision between the PUSCH and the SR is to occur. At block 810, the WTRU 102 may determine a priority for each transmission (e.g., a priority for the PUSCH and a priority for the SR). At block 815, the WTRU 102 may determine whether the priority of the PUSCH is less than the priority of the SR. If the priority of the PUSCH is less than the priority of the SR, at block 820, the WTRU 102 may determine whether the PUSCH transmission has started and whether the transport block (TB) has already been constructed, for example at the physical layer. If the PUSCH transmission has started and the TB has already been constructed, at block 825, the WTRU 102 may drop or suspend the PUSCH transmission and, at block 830, the WTRU 102 may transmit the SR. If the PUSCH transmission has not started and/or the TB has not already been constructed, at block 835, the WTRU 102 may determine if the SR can be multiplexed on the PUSCH. If the SR can be multiplexed on the PUSCH, at block 840, the WTRU 102 may multiplex the SR on the PUSCH and, at block 845, the WTRU 102 may transmit both the SR and the PUSCH. If the SR cannot be multiplexed on the PUSCH, at block 850, the WTRU 102 may drop or may suspend the PUSCH at the physical layer or at a higher layer (e.g., the MAC layer) (for example by not generating a PDU) and, at block 830, the WTRU 102 may transmit the SR.

If the priority of the PUSCH is not less than the priority of the SR, at block 855, the WTRU 102 may determine whether the PUSCH transmission has started and whether the TB has already been constructed, for example at the physical layer. If the PUSCH transmission has started and the TB has already been constructed, at block 860, the WTRU 102 may determine if the SR is already signaled to the physical layer of the WTRU. If the SR is already signaled to the physical layer of the WTRU 102, at block 865, the WTRU 102 may drop the SR. If the SR is not already signaled to the physical layer of the WTRU 102, at block 870, the WTRU 102 may not or will not instruct the physical layer of the WTRU 102 to generate an SR transmission. If the PUSCH transmission has not started and/or the TB has not already been constructed, at block 875, the WTRU 102 may determine if the reliability and/or latency of the PUSCH is compromised if the SR is multiplexed with the PUSCH. If the reliability and/or latency of the PUSCH is compromised by the SR being multiplexed with the PUSCH, at block 880, the WTRU may determine if the SR is already signaled to the physical layer. After block 880, if the SR is already signaled to the physical layer, at block 865, the WTRU 102 may drop the SR. After block 880, if the SR is not already signaled to the physical layer of the WTRU 102, at block 870, the WTRU 102 may not or will not instruct the physical layer of the WTRU 102 to generate an SR transmission. After block 875, if the reliability and/or latency of the PUSCH is not compromised by the SR being multiplexed with the PUSCH, at block 885, the WTRU may multiplex the SR on the PUSCH and, at block 890, the WTRU may transmit both the SR and the PUSCH.

Although FIG. 8 illustrates intra-WTRU prioritization for one type of collision (a PUSCH vs SR collision), the same or a substantially similar process may be used for other types of collisions for example including, but not limited to, PUSCH vs UCI collisions.

Representative Procedures for Resource Selection Using Multiple PUSCH Transmissions A WTRU 102 may be configured to transmit more than one PUSCH transmission in a slot (e.g., the same slot) and/or overlapping in the time domain, and the PUSCH transmissions may be on different serving cells and/or different carriers (e.g., each PUSCH transmission may be on a different serving cell and/or a different carrier). The PUSCH transmissions may have different service-related priorities (e.g., each PUSCH transmission may have a different service-related priority). For example, the WTRU 102 may be transmitting a low priority PUSCH on a carrier (e.g., one carrier). A new higher priority SR or UCI may be triggered, for example while the WTRU 102 may be transmitting the low priority PUSCH on the carrier. The carrier may map to a PUCCH resource on a different carrier that may overlap in the time domain. In certain examples, the WTRU 102 may be transmitting low priority UCI and/or SR on one carrier while new high priority data may arrive that may be configured and/or scheduled to be transmitted on a different carrier. The WTRU 102 may be configured and/or scheduled with PUSCH resources on different carriers, that may potentially carry data traffic of different priorities.

The WTRU 102 may select at least one PUSCH for multiplexing UCI, based on any of the following criteria:
(1) whether the PUSCH transmission is suitable for the transmission of a combination of UCI and data;
(2) one or more service-level priorities associated with the PUSCH and UCI; and/or
(3) any criterion used for selection of a PUSCH transmission used in existing systems (e.g., NR Release 15, for example as specified in TS 38.213 v15.6.0 including Section 9), such as whether PUSCH is scheduled by the DCI, whether aperiodic CSI is to be multiplexed in a PUSCH, the serving cell index of the PUSCH, and/or whether timeline conditions related to processing time are satisfied, among others).

The WTRU 102 may determine a subset of PUSCH transmissions as candidate PUSCH transmissions for multiplexing UCI of a given type and/or priority. The WTRU 102 may then determine a subset of the candidate PUSCH transmissions. The subset of the candidate PUSCH transmissions are determined by the WTRU 102 to be suitable for the transmission of the combination of the UCI and data. The determination may be performed based on one or more examples disclosed herein. The WTRU 102 may select a PUSCH from among the subset based on one or more rules, for example specified for existing systems. For example, the WTRU 102 may select the PUSCH with a smallest serving cell index within the subset. In case there is no suitable PUSCH transmission within the candidate PUSCH transmissions, the WTRU 102 may determine a prioritized resource (e.g., according to one or more of the examples disclosed herein. For example, if the prioritized resource is a PUCCH transmission and/or simultaneous PUCCH and PUSCH transmission is not allowed within a serving cell or within a cell group, the WTRU 102 may drop the one or more PUSCH transmissions in the same serving cell or in all serving cells of the cell group.

The subset of candidate PUSCH transmissions for UCI of a given type and/or priority may include, consist of, or be determined from, any of the following: (1) a set (e.g., whole set) of PUSCH transmissions that the WTRU 102 is configured to transmit on; (2) a subset of PUSCH transmissions of the same service-related priority as the UCI and for example in case of periodic CSI, the service-related priority may be configured or defined to correspond to a specific priority, such as a lowest priority; (3) a subset of PUSCH transmissions of the highest service-related priority among the set (e.g., whole set) of PUSCH transmissions; (4) a subset of PUSCH transmissions scheduled by dynamic grants, configured grants, for semi-persistent PUSCH and/or for which aperiodic CSI is requested; and/or (5) the PUSCH transmission (e.g., only the PUSCH transmission) determined according to the rules used for a selection of the PUSCH in existing systems (Release 15), among others.

In case a collision occurs for the UCI of more than one type and/or priority, the subset of candidate PUSCH transmissions may be different for each UCI and/or each UCI may be multiplexed on a different PUSCH. For example, a WTRU 102 may multiplex HARQ-ACK of a first priority in a PUSCH of a first priority and may multiplex HARQ-ACK of a second priority in a PUSCH of a second priority. In certain representative embodiments, multiplexing of the UCI may be allowed in a single PUSCH only. In this case, for any UCI the subset of candidate PUSCH may be determined as the one applicable to a highest priority UCI.

For example, in a scenario the WTRU 102 may, in a given slot, transmit a first PUSCH of a first priority (e.g., associated with a URLLC service) in a first serving cell, a second PUSCH of a second priority (e.g. associated with an eMBB service) in a second serving cell, and a third PUSCH of a second priority (e.g., associated with an eMBB service) in a third serving cell. In case the WTRU 102 would be or is to be transmitting HARQ-ACK of second priority (e.g., associated with an eMBB service) in a PUCCH in the same slot, the WTRU 102 may multiplex the HARQ-ACK of second priority in the second PUSCH. In case the WTRU 102, in addition, would be or is to be transmitting HARQ-ACK of first priority in a PUCCH in the same slot, the WTRU 102 may multiplex the HARQ-ACK of first priority in the first PUSCH. In the above scenario, the WTRU 102 may multiplex UCI of different priorities in different PUSCH transmissions in the same slot.

In case the subset of candidate PUSCH transmissions for a UCI of given type and/or priority is empty according to one set of criteria, the WTRU 102 may fall back to a second (e.g., less restrictive) set of criteria. For example, for a UCI of a given service-related priority, the subset of candidate PUSCH transmissions may correspond to PUSCH transmissions of a same service-related priority if there is at least one such PUSCH transmission, and, otherwise, may correspond to the set (e.g., whole set) of PUSCH transmissions.

In some scenarios, the WTRU 102 may not be able to transmit both the PUSCH and the PUCCH simultaneously, or the WTRU 102 may not be able to transmit: (1) the PUSCH and the PUCCH, simultaneously; (2) the PUSCH and the PUSCH, simultaneously; or (3) the PUCCH and the PUCCH} simultaneously while meeting the reliability requirement for a higher priority transmission. The WTRU 102 may drop a low priority transmission and may transmit a high priority transmission. The WTRU 102 may puncture the low priority transmission on an overlapping part in time with the higher priority transmission. The WTRU 102 may multiplex the SR or UCI on the PUSCH transmission, if reliability and/or latency metrics are met for the high priority transmission. In another example, if the overlapping transmissions have not started, the WTRU 102 may apply a different transmission power and/or power control parameters. In certain examples, the WTRU 102 may first allocate power for the higher priority transmission before allocating any power (considering, in accordance with and/or based on the power headroom of the WTRU 102) for a lower priority overlapping transmission. In other examples, the WTRU 102 may be configured by higher layers with two sets of power control parameters; the WTRU 102 may select a certain set of power control parameters for a PUCCH transmission or a PUSCH transmission when (e.g., only when) the PUCCH transmission or the PUSCH transmission overlaps with another PUSCH transmission or another PUCCH transmission.

In certain representative embodiments, the WTRU 102 may drop a Transport Block (TB) generated for transmission on a given carrier, if the TB overlaps with a transmission of a higher priority on a different carrier. The WTRU 102 may determine, set, and/or consider a subset of resources as inactive, and/or not generate a PDU applicable for such resources, for example if the subset of resources overlap with another resource applicable for transmission of higher priority data on a different carrier. In certain examples, the WTRU 102 may be configured with two or more configured grants on different carriers that may overlap in the time domain. For example, a first configured grant CG1 may carry data of all priorities and a second configured grant CG2 may carry data (e.g., only data) from lower priorities. When the WTRU 102 has buffered data of high and low priorities, the WTRU 102 may multiplex the data from low and high priority LCHs on the first configured grant CG1 (e.g., the first configured grant CG1 only) and may not generate a TB for the second configured grant CG2, for example if the second configured grant CG2 overlaps in the time domain with the CG occasion associated with the first configured grant CG1.

Representative Procedures for Handling of Non-Prioritized Resources

For at least one colliding resource, the WTRU 102 may transmit over at least one portion not overlapping with a prioritized resource such that the overlap may be in the time domain (e.g., the time domain only) or in both the time and frequency domains. For example, a first resource may be a PUSCH transmission resource with a duration of 14 symbols and a second (e.g., prioritized) resource may be a PUCCH transmission with a duration of 2 symbols that overlaps with the $3^{rd}$ and $4^{th}$ symbols of the first resource. The WTRU 102 may transmit the 2 first symbols of the first resource, skipping the $3^{rd}$ and $4^{th}$ symbols of the first resource and transmit the second resource, and then transmit the first resource from the $5^{th}$ symbol.

When at least one portion of a first resource overlaps with a second (e.g., prioritized) resource, the WTRU 102 may determine whether to transmit on the first resource at least on a remaining, non-overlapping portion based on any of the following conditions (1) if the code block group based HARQ is configured for the transmission (e.g., at least for a PUSCH transmission); (2) if at least a certain number (e.g., one) of the one or more code blocks and/or one or more code block groups are mapped on the non-overlapping portion; (3) if, at most, a certain number of the one or more code blocks and/or one or more code block groups are mapped over one or more skipped portions; (3) if the non-overlapping portion or portions are above a certain fraction of the resource; (4) if reference signals (e.g., the DM-RS) are present in the non-overlapping portion; and/or (5) if the second transmission can be multiplexed on the first transmission.

Representative Procedures for Multiplexing

In some examples, a WTRU 102 may multiplex UCI and/or data that may be associated to different service-based priority levels into a single resource. For example, the WTRU 102 may multiplex HARQ-ACK and/or SR and/or data associated to different service-based priority levels into a single PUCCH or a single PUSCH.

When multiplexing the UCI on the PUSCH, the set of resource elements available for UCI may depend on a service-based priority level associated to the UCI. For example, the number of resource elements available for the HARQ-ACK and/or the SR may be zero for the N last time symbols for certain priority levels. The value of N may depend on a latency requirement applicable to the priority level. For example, N may be such that the last N symbols may not or are not to overlap with a PUCCH resource that may carry HARQ-ACK and/or SR in the absence of a collision.

The WTRU 102 may multiplex UCI and/or data associated to different service-based priority levels on the PUSCH or the PUCCH. In some examples, the WTRU 102 may encode (e.g., jointly encode) the UCI (e.g., the HARQ-ACK and/or the SR) associated to different priority levels prior to multiplexing on the PUSCH or the PUCCH. In the case of PUSCH, the WTRU 102 may determine a number of coded modulation symbols per layer (Q') for the jointly encoded UCI by using a set of parameters (alpha, beta) configured for the highest priority level among the jointly encoded UCI.

In certain representative embodiments, the WTRU 102 may encode (e.g., separately encode) UCI (e.g., HARQ-ACK/SR) associated to different priority levels prior to multiplexing on the PUCCH or the PUSCH. In the case of PUSCH, the WTRU 102 may determine a number of coded modulation symbols per layer (Q') for each priority level by using parameters (alpha, beta) specific to the priority level (e.g., each priority level). The WTRU 102 may map the coded modulation symbols to different sets of resource elements of the PUSCH.

When multiplexing UCI associated to different priority levels with data on the PUSCH, the WTRU 102 may first encode and multiplex a first subset of the UCI and data on the PUSCH, assuming a first set of available resource elements, and may encode a second subset of UCI and replace the values (e.g., puncture or overwrite) a subset of the coded bits or modulated symbols previously determined for the first subset of the UCI and/or data. Alternatively, multiplexing can be performed by "rate-matching", wherein the WTRU 102 may encode the first subset assuming that the first set of available resource elements is reduced by a second set of resource elements required for mapping modulation symbols of the second subset, and where coded bits of the second subset are modulated and mapped on the second set of available resource elements and do not overwrite coded bits of the first subset.

Whether joint or separate encoding is employed, and/or whether multiplexing for a subset of UCI is performed by puncturing, may depend on the following: (1) the priority levels associated to the different UCI; (2) the number of bits of the different UCI; (3) the available processing time, as determined for example by the time difference between a PDCCH transmission or a PDSCH transmission and the corresponding resource where HARQ-ACK is reported (for example in case of a HARQ-ACK).

For example, HARQ-ACKs of different priority levels may be jointly encoded if the total number of HARQ-ACK bits is below a threshold, or if the number of HARQ-ACK bits for at least one priority level is below a threshold.

For example, UCI (e.g., HARQ-ACK and/or SR) associated to a higher priority level may be multiplexed by puncturing UCI and/or data associated to a lower priority level.

For example, the HARQ-ACK associated to a PDSCH transmission ending less than X symbols before a start of the PUSCH resource may be multiplexed by puncturing UCI and/or data that may be associated to earlier PDCCH transmissions or earlier PDSCH transmissions.

In some examples, when the HARQ-ACK associated to multiple priority levels may be multiplexed on the same PUCCH resource or the same PUSCH resource, the WTRU 102 may encode a minimum of M HARQ-ACK bits for at least one priority level even if no PDSCH assignment was received for the corresponding priority level. M may be set to any positive integer number, and for example to 2. This example may ensure that decoding of the HARQ-ACK associated to the highest priority level does not fail because of the failure of detecting a single or a plurality of PDSCH assignments for lower priority transmissions. This example may be used in case (e.g., only in case) the PUCCH resource or the PUSCH resource is allowed to carry HARQ-ACK associated to the lower priority level. For example, in case a PUSCH transmission satisfies the conditions to multiplex (e.g., potentially multiplex) HARQ-ACK of a higher priority level and of a lower priority level, and the WTRU 102 determined that N1 HARQ-ACK bits are to be or need to be multiplexed for the higher priority level, but no HARQ-ACK for the lower priority level, the WTRU 102 may in addition multiplex M HARQ-ACK bits set to 0 for the lower priority level.

In some examples, a SR may be multiplexed with other UCI and/or data on the PUCCH or the PUSCH. The SR may be jointly encoded with a HARQ-ACK, for example if (e.g., only if) it is associated to the same priority level, or may be separately encoded from another UCI. In the latter case, when multiplexed on the PUSCH, the WTRU 102 may determine a number of coded modulation symbols per layer (Q') for the SR at the given priority level by using parameters (alpha, beta) configured separately for the SR. In certain representative embodiments, the same parameters as for HARQ-ACK at the same priority level may be reused.

The number of bits for the SR may be determined based on a number K of scheduling requests whose corresponding PUCCH resources may or are to overlap with the PUCCH or the PUSCH used for multiplexing. For example, in case SR is multiplexed on the PUSCH, a number (e.g., only a number) K' of scheduling requests associated to a priority level higher than PUSCH may be included. For example, a number of bits corresponding to the smallest integer larger than log 2(K+1) or log 2(K'+1) may be included.

Representative Procedures for Determination of Overflow Resources

Figure 9:
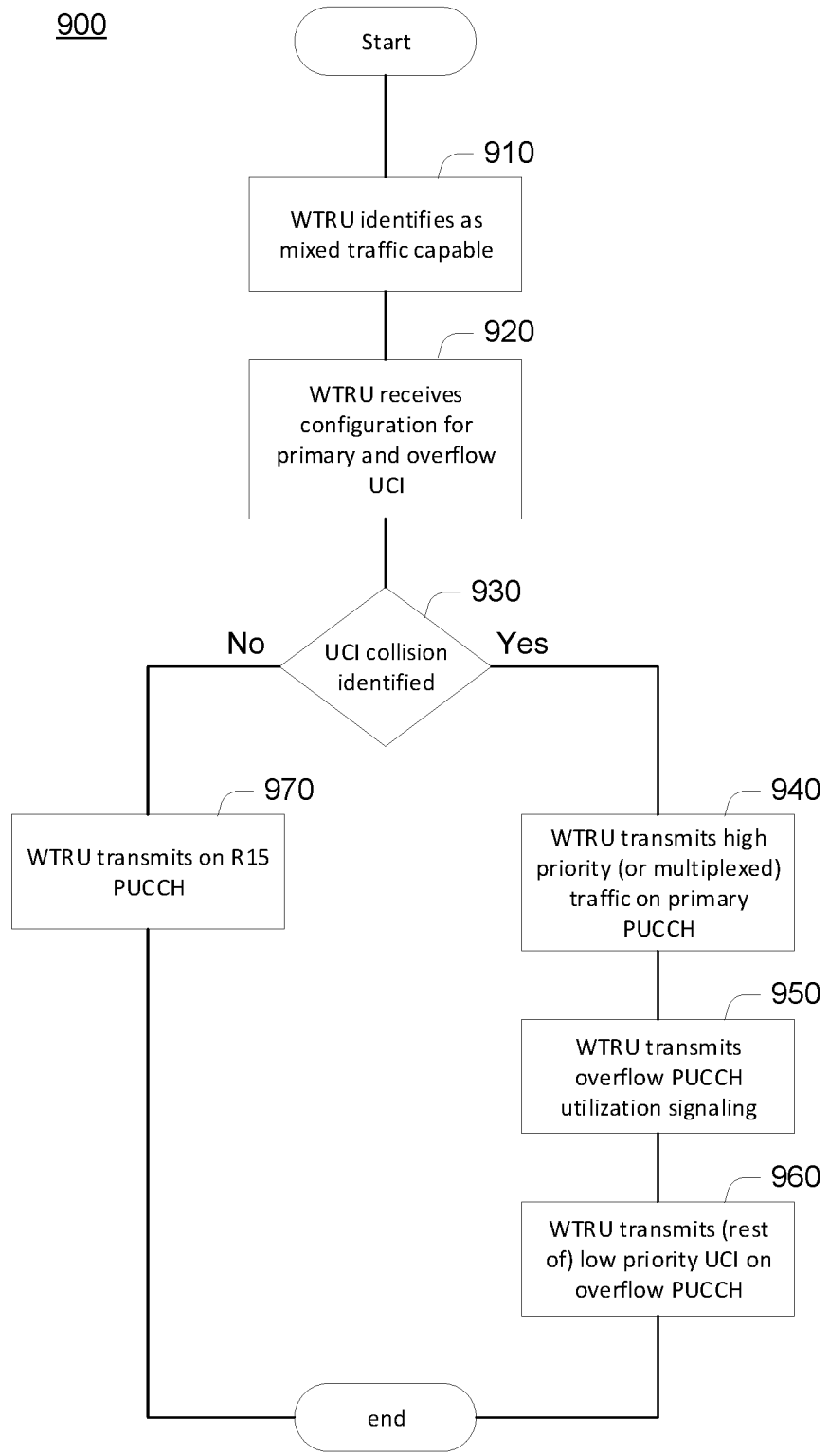
FIG. 9 is a diagram illustrating a representative procedure using overflow resources.

FIG. 9 is a diagram illustrating a representative procedure using overflow resources.

Referring to FIG. 9, an overflow resource procedure 900 may include, at block 910, a WTRU 102 being identified as mixed traffic capable. At block 920, the WTRU 102 may receive a configuration for primary and overflow UCI. At block 930, the WTRU 102 may determine if a UCI collision is identified (e.g., is to occur). If a UCI collision is to occur, at block 940, the WTRU 102 may transmit high priority (e.g., first priority or multiplexed) traffic on the primary PUCCH. At block 950, the WTRU 102 may transmit overflow PUCCH utilization signaling. At block 960, the WTRU 102 may transmit low priority UCI (e.g., second priority, lower priority, and/or the remaining UCI) on the overflow PUCCH. If a UCI collision is not identified (e.g., is not to occur), at block 970, the WTRU 102 may transmit on a 5G NR standalone and/or non-standalone PUCCH (e.g., a 3GPP Release 15 and beyond PUCCH).

For example, a WTRU 102 may be configured with more than one PUCCH resource set, for example a primary resource and one or more overflow or secondary resources. The number of resource sets the WTRU 102 selects may be associated with the number UCI with different service-based priority levels the WTRU 102 has to transmit. It is contemplated that for a service-based priority based on latency, the primary resource may start earlier and be shorter than the secondary resource.

In one example, the primary and overflow resources may be in separate time and frequency resources with no overlap in either time or frequency.

In one example, the primary and overflow resources may be separate in time (e.g., time only) or in frequency (frequency only) (e.g., the primary and overflow resources may be separate in time but not in frequency or separate in frequency but not in time.

In one example, the WTRU 102 may be statically, semi-statically and/or dynamically configured with one or more dedicated overflow resources. In certain representative embodiments, the WTRU 102 may be statically, semi-statically and/or dynamically configured with one or more common overflow resources (e.g., multiple WTRUs 102 may be configured with the same overflow resource or resources). In certain representative embodiments, the WTRU 102 may be statically, semi-statically and/or dynamically configured with a mix of dedicated and common overflow resources.

In one example, the WTRU 102 may determine the timing and/or resource allocation of an overflow resource from the resource allocation of a primary resource. The WTRU 102 may use the overflow resource conditionally when the primary resource is dropped, suspended and/or deprioritized due to intra-WTRU or inter-WTRU prioritization. For example, the WTRU 102 may drop the transmission of a HARQ-ACK (e.g., due to intra-WTRU prioritization) and may use an overflow resource to transmit the deprioritized HARQ-ACK. The WTRU 102 may use the previously (or initially) indicated PUCCH resource and HARQ-ACK timing to determine an overflow PUCCH resource. For example, the WTRU 102 may use a previously signaled K1 (e.g., which is generally the delay between PDSCH and corresponding PUCCH) and PRI (e.g., which may be defined as a PUCCH resource indicator) associated with a PUCCH resource to determine another PUCCH overflow resource that starts K1 (or a function of the previously signaled K1) slot after deprioritizing the HARQ-ACK transmission.

The primary and overflow resource or resources may be used to transmit UCI for traffic of different priorities. In this case, the higher priority level traffic may be transmitted in the primary resource to satisfy the traffic priority level (e.g. latency) and or while the overflow resource may be used to transmit the lower priority traffic. In certain representative embodiments, the primary resource may be used to transmit a multiplexed higher and lower priority UCI with the overflow resource being used to transmit lower priority UCI (e.g., only lower priority UCI).

Explicit or implicit signaling may be needed from the WTRU to a network entity (e.g., gNB or other Access Point) to indicate the traffic (e.g., specific traffic) that is transmitted in the which resource. In one example, the WTRU 102 may transmit overflow utilization signaling to the network entity and/or the gNB to indicate the WTRU's use of the overflow resource (e.g., in a transmission of an overflow utilization signaling), as a separate UCI and/or as part of the UCI on the primary PUCCH resource. The overflow utilization signaling may be a flag or indicator (e.g., a single bit indicator or multi-bit indicator) that indicates the use of an overflow resource and/or may include information on the specific PUCCH resources or resources used. In one example, the WTRU 102 may assume or determine that the network entity or the gNB may implicitly identify the use of the overflow resource due to transmission of unexpected higher priority UCI on the primary resource.

In the event that a WTRU 102 is configured with non-dedicated overflow resources, a collision between or among multiple WTRUs 102 is possible, if the WTRUs 102 use the overflow resources, simultaneously. The network entity or the gNB may explicitly acknowledge receipt of information in the non-dedicated overflow resources. To mitigate the effect of possible collisions, in one embodiment, the WTRU 102 may be configured to transmit information in a non-orthogonal manner in the non-dedicated resources (e.g., using a Non-Orthogonal Multiple Access (NOMA) waveform to allow multiple WTRUs 102 access the resource. As the information transmitted is most likely from lower priority traffic, this may be acceptable. In one example, the WTRU 102 may be configured to access the overflow resource using a Listen-Before-Talk mechanism such as in NR-U or using a random access mechanism in which the WTRU 102 may randomly select a subset of the non-dedicated resource (e.g., selects a code, a frequency, and/or a time). In certain representative embodiments, the overflow resources may be restricted to PUCCH formats, for example that may allow multiplexing of data from multiple WTRUs 102 within the same time-frequency resources (e.g., by using a sequence based PUCCH.

In one example, on identification of a UCI collision between traffic with different priority levels, the WTRU 102 may autonomously switch to the primary and overflow UCI transmission configuration.

Some examples of collision scenarios and possible exemplary solutions are described herein. In the following, "eMBB" may refer to a first service-based priority level and "URLLC" may refer to a second service-based priority level such that, for example URLLC may have higher priority than eMBB.

Representative Procedures for Collision Between a HARQ-ACK of the eMBB and a HARQ-ACK of the URLLC.

Priority of HARQ-ACK may be indicated in scheduling DCI (and/or an activation DCI command for DL SPS).

The WTRU 102 may multiplex the HARQ-ACKs of the eMBB and the URLLC on the PUCCH resource indicated for the URLLC, if a maximum code rate applicable to the URLLC is not exceeded, otherwise the WTRU 102 may drop the HARQ-ACK of the eMBB. The maximum code rate may be configured separately, when UCI of the eMBB (e.g., only eMBB UCI) is multiplexed. The power control parameters applicable to HARQ-ACK of the URLLC may be used.

Representative Procedures for Collision Between eMBB HARQ-ACK and URLLC PUSCH

Priority of PUSCH may be indicated by DCI and/or for configured grants type 1 by RRC signaling. Priority of the HARQ-ACK may be indicated in scheduling DCI (and/or an activation DCI command for DL SPS).

Representative Procedures for eMBB HARQ-ACK Multiplexed into URLLC PUSCH.

The WTRU 102 may use an additional set of parameters (e.g., $\alpha$ and $\beta^{PUSCH}_{offset}$) configured for the case of low-priority HARQ-ACK multiplexed into high-priority PUSCH, for example to avoid too many resources being used for the HARQ-ACK of the eMBB for the required reliability, and to ensure that sufficient resources are kept for the PUSCH of the URLLC.

Representative Procedures for Collision Between eMBB PUSCH and URLLC SR

Priority of the PUSCH may be indicated by DCI and/or for configured grants type 1 by RRC signaling. Priority of SR may be indicated by RRC signaling for a corresponding SR configuration.

The WTRU 102 may multiplex the SR on the PUSCH, if conditions are satisfied, and may, otherwise, drop the PUSCH at least for the overlapping portion, for example when the SR is positive For example, the condition may include any of: (1) the PUSCH resources in the time domain are within PUCCH resource for the SR (for example, to ensure the latency requirement is satisfied); and/or (2) the number of coded modulation symbols per layer $Q'_{SR}$ is less than a threshold (for example to ensure the reliability requirement is satisfied), among others.

When multiplexing an SR of the URLLC SR on the PUSCH of the eMBB: the WTRU 102 may jointly encode with an HARQ-ACK of the URLLC (for example, if present) at least if the number of HARQ-ACK bits is larger than 2. The WTRU 102 may use additional set of parameters (e.g., $\alpha$ and $\beta^{PUSCH}_{offset}$) configured for the case of high-priority HARQ-ACK multiplexed into low-priority PUSCH.

Representative Procedures for Collision Between eMBB PUSCH and URLLC HARQ-ACK

Priority of PUSCH may be indicated by DCI and/or for configured grants type 1 by RRC signaling. Priority of HARQ-ACK may be indicated in scheduling DCI (and/or an activation DCI command for DL SPS).

The WTRU 102 may multiplex HARQ-ACK of the URLLC on the PUSCH of the eMBB, if conditions are satisfied, otherwise the WTRU 102 may drop the PUSCH at least for the overlapping portion. The conditions may include: (1) the PUSCH resources in the time domain being within a sub-slot in which the HARQ-ACK of URLLC is reported, for example to ensure that the latency requirement is satisfied; and/or (2) the number of coded modulation symbols per layer $Q'_{ACK}$ is less than a threshold, for example to ensure the reliability requirement is satisfied.

An additional set of parameters (e.g., $\alpha$ and $\beta^{PUSCH}_{offset}$) may be configured and used for the case of high-priority HARQ-ACK multiplexed into low-priority PUSCH.

In certain representative embodiments, the codebook index may indicate a resource within a slot, such as a sub-slot, mini-slot, or a starting symbol.

Representative Procedures for Prioritization for Transmission Power Reduction

If a total WTRU transmit power on serving cells in a frequency range in a transmission occasion is to exceed or would exceed a threshold (e.g., Pcmax), the WTRU 102 may allocate power according to a priority order. In some examples, the priority order may depend on the service-related priority associated to the transmissions (e.g., each transmission). For example, in certain embodiments, the service-related priority of a transmission may have precedence over a priority derived from the type of information (e.g., whether transmission carries HARQ-ACK, SR, CSI and/or data only) carried by the transmission, at least for some types of transmissions, such as the PUCCH and/or the PUSCH. The prioritization may be set and/or defined by a composite priority index Poverall determined from both types of priority, for example as set forth in Equation 1 as follows:

$$Poverall = Pserv \times Nttype + Pttype \quad (1)$$

where Pserv may be a service-related priority index (e.g., starting with 0 and with higher value representing lower priority), Pttype may be a priority index derived from the type of information, and Nttype may be a number of priority levels for the type of information. For example, the value of Nttype may have 3 priority levels (e.g., with a value of 2 for Pttype associated to a PUSCH transmission without UCI, a value of 1 for Pttype associated to a PUCCH transmission and/or PUSCH transmission with CSI, and a value of for Pttype 0 associated to a PUCCH transmission or a PUSCH transmission with SR and/or HARQ_ACK). In some embodiments, a PUCCH transmission with CSI may be associated with (e.g., always be associated with) a highest Pserv value.

For example, the priority order may be as follows, by descending order: (1) a PRACH transmission on a PCell; (2) a PUCCH transmission and/or a PUSCH transmission where priority may be determined by Poverall; (3) an aperiodic SRS; and (4) semi-persistent and/or periodic SRS and/or PRACH transmission on the SCell.

FIG. 10 is a flowchart illustrating a representative procedure using feedback information (e.g., HCAIs).

Referring to FIG. 10, the representative procedure 1000 may include, at block 1010, a WTRU 102 receiving a first Physical Downlink Shared Channel (PDSCH) associated with a first type of service, a first priority level or a first priority in a first slot or first mini slot and a second PDSCH associated with a second type of service/priority level/priority in a second slot or second mini-slot. At block 1020, the WTRU 102 may determine a first HARQ codebook acknowledgment index (HCAI) based on a property of the first PDSCH or control information associated with the first PDSCH and a second HCAI based on a property of the second PDSCH or control information associated with the second PDSCH. At block 1030, the WTRU 102 may generate for any of: the second slot, the second mini-slot, a subsequent slot or a subsequent mini-slot, a first Physical Uplink Control Channel (PUCCH) including first HARQ acknowledgment (HARQ-ACK) information in accordance with the first HCAI and a second PUCCH including second HARQ-ACK information in accordance with the second HCAI. At block 1040, the WTRU 102 may transmit to a network entity, the first and second PUCCHs. For example, the property of the first PDSCH and the second PDSCH may be any of: a search space, a transmission profile, and/or a temporary identifier.

In certain representative embodiments, the WTRU 102 may multiplex, in separate PUCCH resources, a first set of HARQ-ACK bits, as the first HARQ-ACK information and a second set of HARQ-ACK bits, as the second HARQ-ACK information.

In certain representative embodiments, the first type of service may be an ultra reliable low latency communication (URLLC) service or an enhanced URLLC service and the second type of service may be another type of service and/or the second type of service may be an enhanced Mobile Broadband (eMBB) service or a massive Machine Type Communication (mMTC) service.

In certain representative embodiments, the WTRU 102 may determine a priority level of the PDSCH from the indicated HCAI associated with the PDSCH.

The DCI (e.g., control signaling), for example, may indicate one or more delay periods associated with various services/priority levels. A respective delay period may indicate one of: (1) a time between a transmission of a respective PDSCH and a transmission of a respective PUCCH transmission; (2) a number of slots between the transmission of the respective PDSCH and the transmission of the respective PUCCH transmission; and/or (3) a number of mini-slots between the transmission of the respective PDSCH and the transmission of the respective PUCCH.

FIG. 11 is a flowchart illustrating another representative procedure using feedback information (e.g., HCAIs).

Referring to FIG. 11, the representative procedure 1100 may include, at block 1110, a WTRU 102 receiving a plurality of Physical Downlink Shared Channels (PDSCHs) associated with different types of service, priority level, or priority in a plurality of slots or mini-slots. At block 1120, the WTRU 102 may determine a HARQ codebook acknowledgment index (HCAI) and any of: (1) a type of service for each of the received plurality of PDSCHs (2) a priority level for each of the received plurality of PDSCHs, and/or (3) a priority for each of the received plurality of PDSCHs. At block 1130, the WTRU 102 may determine a number of PUCCHs to be transmitted for a respective slot or a respective mini slot based on the determined HCAIs and the determined types of service/priority level/priority. At block 1140, the WTRU 102 may multiplex in respectively different PUCCH resources of the respective slot or the respective mini slot, the number of PUCCHs. At block 1150, the WTRU 102 may transmit in the respective slot or the respective mini slot, the determined number of PUCCHs. For example, the determined (1) type of service, (2) priority level and/or (3) priority associated with a PDSCH may be indicated by one or more properties of the PDSCH including any of: a search space, a transmission profile, and/or a temporary identifier).

In certain representative embodiments, the WTRU 102 may multiplex a first set of HARQ-ACK bits, as first HARQ-ACK information in accordance with a first HCAI and a second set of HARQ-ACK bits, as the second HARQ-ACK information in accordance with a second HCAI, in separate PUCCH resources of a common slot, (for example on condition that each HARQ codebook includes HARQ-ACK for one or more PDSCHs associated with a HARQ codebook index and/or a priority level).

In certain representative embodiments, the condition for separate PUCCH resources in a common slot may include a first type of service, a first priority level, and/or a first priority being indicated to be associated with the first HCAI and that a different type of service, a different priority level, and/or a different priority being indicated to be associated with the second HCAI.

In certain representative embodiments, the WTRU 102 may multiplex a first set of HARQ-ACK bits, as first HARQ-ACK information associated with a first HCAI and a second set of HARQ-ACK bits, as the second HARQ-ACK information associated with a second HCAI, in separate PUCCH resources of different slot, (for example on condition that each HARQ codebook includes HARQ-ACK for one or more PDSCHs associated with a HARQ codebook index and/or a priority level).

In certain representative embodiments, the condition for separate PUCCH resources in different slots may include a first type of service, a priority level, and/or a priority being indicated to be associated with the first HCAI and that a different type of service, a different priority level, and/or a different priority being indicated to be associated with the second HCAI.

In certain representative embodiments, the WTRU 102 may multiplex a first set of HARQ-ACK bits associated with a first set of PDSCHs and a second set of HARQ-ACK bits associated with a second set of PDSCHs in a common PUCCH resource of the common slot based on multiplexing rules associated with, priorities, priority levels and/or types of service associated with the first and second sets of PDSCHs.

In certain representative embodiments, the first type of service may be an ultra reliable low latency communication (URLLC) service or an enhanced URLLC service and the second type of service may be another type of service and/or, for example, the second type of service may be an enhanced Mobile Broadband (eMBB) service or a massive Machine Type Communication (mMTC) service.

In certain representative embodiments, the priority level may be a highest priority level, for example associated with the most important control signaling and/or data, and one or more lower priority levels, for example associated with less important control signaling and/or data.

In certain representative embodiments, the WTRU 102 may determine to (or whether) to drop at least one PUCCH. For example, the dropping of one or more PUCCHs may be based on any of: (1) a property of at least one PUCCH (2) a PUCCH format of the at least one PUCCH; (3) the HCAI; (4) a transmission profile; (5) a property of the PDSCH transmissions associated to the at least one PUCCH; and/or (6) a property of a corresponding Physical Downlink Control Channel (PDCCH).

In certain representative embodiments, the one of more types of service may include any of: (1) an Ultra Reliable Low Latency Communication (URLLC) service; (2) an enhanced URLLC service; (3) an enhanced Mobile Broadband (eMBB) service; and/or (4) a massive Machine Type Communication (mMTC) service.

In certain representative embodiments, each control signal of HCAI may indicate a delay period associated with any of: (1) a time; (2) a number of slots or (3) a number of mini-slots between a PDSCH transmission and a PUCCH transmission.

In certain representative embodiments, the WTRU 102 may determine to drop at least one PUCCH or PUSCH. For example, the WTRU 102 may determine to drop the at least one PUCCH or PUSCH based on any of: (1) a property of the at least one PUCCH (2) a PUCCH format of the at least one PUCCH; (3) the HARQ codebook index; (4) a transmission profile; (5) a property of the PDSCH transmissions associated to the at least one PUCCH; (6) a priority level; (7) a relative priority level; and/or (8) a property of a corresponding Physical Downlink Control Channel (PDCCH).

FIG. 12 is a flowchart illustrating a representative procedure for time domain overlaps (e.g., of eMBB and URLLC information/control signaling).

Referring to FIG. 12, the representative procedure 1200 may include, at block 1210, a WTRU 102 determining that a Scheduling Request (SR) or HARQ information associated with a certain priority level, e.g. an enhanced Mobile Broadband (eMBB) service, is to overlap in a time domain with a Physical Uplink Shared Channel (PUSCH) associated with a higher priority level, e.g. an Ultra Reliable Low Latency Communication (URLLC) service or enhanced URLLC (eURLLC) service. At block 1220, the WTRU 102 may multiplex the SR or the HARQ information associated with the lower priority level, e.g. eMBB service, on the PUSCH associated with the higher priority level, e.g. URLLC or eURLLC service, on condition that the SR or HARQ information associated with the lower priority level is to overlap in the time domain with the PUSCH associated with the higher priority level. At block 1230, the WTRU 102 may transmit the PUSCH.

In certain representative embodiments, the WTRU 102 may determine a first priority level for the SR or the HARQ information, (for example associated with the eMBB service) and a second priority level for the PUSCH, (for example associated with the URLLC service or eURLLC service).

In certain representative embodiments, the multiplexing of the SR or the HARQ information on the PUSCH may be further conditioned on predetermined rules associated with the first and second priority levels.

FIG. 13 is a flowchart illustrating a representative procedure using overflow resources for deprioritized information/control signaling (e.g., HARQ acknowledgements (HARQ-ACKs)).

Referring to FIG. 13, the representative procedure 1300 may include, at block 1310, a WTRU 102 configuring a primary uplink resource and at least one uplink overflow resource. At block 1320, the WTRU 102 may receive information or control signaling. At block 1330, the WTRU 102 may determine whether a HARQ Acknowledgment (HARQ-ACK) of the information or control signaling is deprioritized. At block 1340, on condition that the HARQ-ACK is deprioritized, the WTRU 102 may transmit the HARK-ACK on the uplink overflow resource. At block 1350, the WTRU 102 may on condition that the HARQ-ACK is not-deprioritized, transmit the HARK-ACK on the primary uplink resource. For example, the WTRU 102 may determine whether a collision between the HARQ-ACK and any of: other information or other control signaling is to occur, may determine whether a priority level of the HARQ-ACK exceeds a priority level of the other information or the other control signaling and on condition that the priority level of the HARQ-ACK does not exceed the priority level of the other information or the other control signaling; the WTRU 102 may deprioritize the HARQ-ACK.

The primary and overflow resources may be in separate time and frequency resources with or without overlap in either time or frequency.

FIG. 14 is a flowchart illustrating a representative procedure using bitfield interpretation (e.g., based on service type).

Referring to FIG. 14, the representative procedure 1400 may include, at block 1410, a WTRU 102 receiving, by the WTRU, information including Downlink Control Information (DCI). At block 1420, the WTRU 102 may determine or obtain from the received information, a type of service/priority level/priority provisioned for the WTRU. At block 1430, the WTRU 102 may perform an interpretation of a set of bitfields in the received DCI based on the determined type of service, the determined priority level and/or the determined priority. At block 1440, the WTRU 102 may configure the WTRU in accordance with the interpretation of the set of bitfields. For example, the interpretation of at least one of the bitfields in the set of bitfields may be different for a first type of service, the priority level and/or the priority relative to a second type of service, the priority level and/or the priority.

In certain representative embodiments, the interpretation of the at least one of the bitfields in the set of bitfields may be associated with: (1) a first type of unit for the first type of service/priority level/priority, and (2) a second type of unit for the second type of service/priority level/priority. For example, the first type of unit is: (1) a symbol; (2) a group of symbols; (3) a mini-slot; (4) a slot; or (5) a subframe and/or the second type of unit is a different one of: (1) the symbol; (2) the group of symbols; (3) the mini-slot; (4) the slot; or (5) the subframe. As another example, the first type of unit may be a symbol used in association with HARQ feedback timing for an Ultra Reliable Low Latency Communications (URLLC) service or an enhanced URLLC service; and the second type of unit may be a slot used in association with HARQ feedback timing for the enhanced Mobile Broadband (eMBB) service.

In certain representative embodiments, the WTRU 102 may determine or obtain one or more types of service/priority level/priority provisioned for the WTRU from any of: (1) the DCI; (2) Radio Resource Control (RRC) signaling; and/or (3) one or more System Information Blocks (SIBs).

In certain representative embodiments, the type of service may be any of: an Ultra Reliable Low Latency Communications (URLLC) type service; an enhanced URLLC; enhanced Mobile Broadband (eMBB) type service; or a massive Machine Type Communications (mMTC) type service.

In certain representative embodiments, the received information may include any of: control channel configuration information and/or a PDSCH time domain value. For example, the WTRU 102 may determine the type of provisioned service, the priority level and/or the priority from the included control channel configuration information or the included PDSCH time domain value.

In certain representative embodiments, the control channel configuration information may include any of: (1) a search space monitoring pattern; (2) a search space monitoring periodicity; (3) a search space duration; (4) a CORESET configuration; (5) a RNTI used for scrambling a Cyclic Redundancy Check (CRC); and/or (6) a Bandwidth Part configuration.

In certain representative embodiments, on condition that the DCI received by the WTRU 102 is within a search space configured with the search space monitoring pattern, the WTRU 102 may determine that the type of service, the priority level or the priority provisioned for the WTRU is a first type of service, a first priority level or a first priority and on condition that the DCI received by the WTRU is not within a search space configured with the search space monitoring pattern, the WTRU 102 may determine that the type of service provisioned for the WTRU is the second type of service, a second priority level or a second priority.

In certain representative embodiments, on condition that the monitoring periodicity exceeds a periodicity threshold, the WTRU 102 may determine that the type of service, the priority level or the priority provisioned for the WTRU is a first type of service, a first priority level or a first priority and on condition that the monitoring periodicity does not exceed the periodicity threshold, the WTRU 102 may determine that the type of service, the priority level or the priority provisioned for the WTRU is a second type of service, a second priority level or a second priority.

In certain representative embodiments, on condition that the DCI received by the WTRU 102 is within a search space with a duration shorter than a K slots, where K is an integer, the WTRU 102 may determine that the type of service, the priority level or the priority provisioned for the WTRU is a first type of service, a first priority level or a first priority and on condition that the duration is equal to or longer than the K slots, the WTRU 102 may determine that the type of service, the priority level or the priority provisioned for the WTRU is a second type of service, a second priority level or a second priority.

In certain representative embodiments, on condition that the PDSCH time domain value is below a threshold value or within a range between threshold values, the WTRU 102 may determine that the type of service, the priority level or the priority provisioned for the WTRU is a first type of service, a first priority level or a first priority and on condition that the PDSCH time domain value is not below the threshold value or within the range between threshold values, the WTRU 102 may determine that the type of service, the priority level or the priority provisioned for the WTRU is a second type of service, a second priority level or a second priority.

In certain representative embodiments, the set of bitfields in the received DCI may include a HARQ timing indication value in a HARQ timing indication bitfield. For example, the interpretation of the HARQ timing indication value in the HARQ timing indication bitfield may be based on any of: (1) one or more Physical Downlink Shared Channel (PDSCH) time domain allocation values; (2) a DMRS mapping type; (3) a starting symbol of the PDSCH; (4) a length of a PDSCH transmission; (5) an offset or a delay between reception of the PDCCH and the starting symbol of the PDSCH; and/or (6) one or more HARQ process ID values.

In certain representative embodiments, the WTRU 102 may determine that a PDSCH transmission belongs to a first set of PDSCH transmissions associated with the first type of service, the first priority level or the first priority, if a PDSCH duration is below a threshold, and that the PDSCH transmission belongs to a second set of PDSCH transmissions associated with the second type of service, the second priority level or the second priority, otherwise.

FIG. 15 is a flowchart illustrating a representative procedure for HARQ feedback (e.g., based on service type).

Referring to FIG. 15, the representative procedure 1500 may include, at block 1510, a WTRU 102 receiving, by the WTRU, information. At block 1520, the WTRU 102 may determine from the received information, that the WTRU is provisioned for a first type of service/priority level/priority.

At block 1530, the WTRU 102 may generate coded bits for transmission associated with the first type of service/priority level/priority. At block 1540, the WTRU 102 may overwrite a subset of the coded bits generated, as overwritten coded bits, with coded bits associated with a second type of service/priority level/priority to generate a sequence of coded bits associated with the first and second services/priority levels/priorities, the second type of service/priority level/priority having a higher priority level than a priority level of the first type of service/priority level/priority. At block 1550, the WTRU 102 may generate using the sequence of coded bits associated with the first and second services/priority levels/priorities, a signal for transmission. At block 1550, the WTRU 102 may transmit to a network entity the signal.

In certain representative embodiments, the coded bits of the transmitted signal may include a set of coded bits associated with a control function or data of the first type of service/priority level/priority and a set of coded bits associated with a control function of the second type of service/priority level/priority.

In certain representative embodiments, the first type of service may be an enhanced Mobile Broadband (eMBB) service and the second type of service may be an Ultra Reliable Low Latency Communication (URLLC) or enhanced URLLC.

In certain representative embodiments, the control function or the data of the first type of service/priority level/priority may be any of: (1) a scheduling request (SR), (2) a HARQ-ACK; (3) CSI or (4) data of the first type of service/priority level/priority and/or the control function of the second type of service/priority level/priority may be any of: (1) an SR, (2) a HARQ-ACK or (3) CSI of the second type of service/priority level/priority.

In certain representative embodiments, the WTRU 102 may determine whether a number of coded bits of the first type of service/priority level/priority to be overwritten has a correspondence with a number of bits to replace the overwritten coded bits. For example, on condition that the number of bits of the first type of service, the first priority level or the first priority to be overwritten has a correspondence with the number of coded bits to replace the overwritten coded bits, the WTRU 102 may overwrite the number of coded bits of the first type of service, the first priority level or the first priority. As another example, on condition that the number of coded bits of the first type of service, first priority level or the first priority to be overwritten has no correspondence with the number of coded bits to replace the coded bits to be overwritten, the WTRU 102 may drop without overwriting a portion of the coded bits of the first type of service, the first priority level or the first priority and replacing the dropped bits with a set of the coded bits associated with the second type of service, the second priority level or the second priority.

The overwriting of the subset of the coded bits associated with the first type of service, the first priority level or the first priority may include the WTRU determining a first sequence of coded bits associated with the first type of service the first priority level or the first priority; determining, positions in the first sequence of coded bit associated with the first type of service, the first priority level or the first priority to be replace with coded bits of the associated with the second type of service, the second priority level or the second priority, and removing, at the coded bits of the first sequence at the determined positions; and/or inserting, at the determined positions coded bits associated with the second type of service.

FIG. 15 is a flowchart illustrating a representative procedure for HARQ feedback (e.g., based on service type).

Referring to FIG. 15, the representative procedure 1500 may include, at block 1510, a WTRU 102 receiving information. At block 1520, the WTRU 102 may determine from the received information that the WTRU is provisioned for a first type of service or first priority level and a second type of service or second priority level. At block 1530, the WTRU 102 may configure the WTRU for transmission of a first HARQ feedback that is associated with the first type of service or first priority level and a second HARQ feedback that is associated with the second type of service or second priority level.

In certain representative embodiments, the configuration of the WTRU for transmission of the first HARQ feedback that is associated with the first type of service or first priority level and the second HARQ feedback that is associated with the second type of service or second priority level may include a setting of a first portion of time-frequency resources to carry the first HARQ feedback and a second, separate portion of the time-frequency resources to carry the second HARQ feedback.

In certain representative embodiments, the WTRU 102 may receive first data associated with the first type of service or first priority level and second data associated with the second type of service or second priority level such that a first delay time between a reception of the first data and a transmission of the first HARQ feedback may be smaller than a second delay time between a reception of the second data and a transmission of the second HARQ feedback. For example, the first type of service or first priority level may be or may correspond to Ultra Reliable Low Latency Communication (URLLC) service or enhanced URLLC (eU-RLLC) service and the second type of service or second priority level may be or may correspond to an enhanced Mobile Broadband (eMBB) service. For example, the first priority level may be a priority associated with the URLLC or eURLLC service and the second priority may be a priority level associated with eMBB.

In certain representative embodiments, the second HARQ feedback may be sent in a long format Physical Uplink Control Channel (PUCCH) and/or the first HARQ feedback may be sent in a format with a latency that is shorter than the second HARQ feedback.

FIG. 16 is a flowchart illustrating a representative overwrite procedure.

Referring to FIG. 16, the representative procedure 1600 may include, at block 1610, a WTRU 102 receiving information. At block 1620, the WTRU 102 may determine from the received information that the WTRU 102 is provisioned for a first type of service or first priority level. At block 1630, the WTRU 102 may generating coded bits for transmission associated with the first type of service/priority level. At block 1640, the WTRU 102 may overwrite a subset of the coded bits generated, as overwritten coded bits, with coded bits associated with a second type of service or second priority level to generate a sequence of coded bits associated with the first and second services/priority levels. In certain embodiments, the second type of service may have a higher priority level than a priority level of the first type of service. At block 1650, the WTRU 102 may generate, using the sequence of coded bits associated with the first and second services/priority levels, a signal for transmission. At block 1660, the WTRU 102 may transmit to a network entity, the generated signal.

In certain representative embodiments, the coded bits of the transmitted signal may include a set of coded bits associated with a control function or data of the first type of service/priority level and a set of coded bits associated with a control function of the second type of service/priority level. For example, the first type of service/priority level may be or may correspond to an eMBB service and the second type of service may be a URLLC service or an eURLLC service.

The control function or the data of the first type of service/priority level may be, for example any of: (1) a scheduling request (SR), (2) a HARQ-ACK; (3) CSI and/or (4) data of the first type of service/priority level; and/or the control function of the second type of service/priority level may be any of: (1) an SR, (2) a HARQ-ACK and/or (3) CSI of the second type of service/priority level.

In certain representative embodiments, the WTRU 102 may determine whether a number of coded bits of the first type of service/priority level to be overwritten has a correspondence with a number of bits to replace the overwritten coded bits and on condition that the number of bits of the first type of service/priority level to be overwritten has a correspondence with the number of coded bits to replace the overwritten coded bits, the WTRU 102 may overwrite the number of coded bits of the first type of service/priority level.

In certain representative embodiments, on condition that the number of coded bits of the first type of service/priority level to be overwritten has no correspondence with the number of coded bits to replace the coded bits to be overwritten, the WTRU 102 may drop a portion of the coded bits of the first type of service/priority level and replace the dropped bits with a set of the coded bits associated with the second type of service/priority level. For example, the overwriting of the subset of the coded bits associated with the first type of service/priority level may include: the WTRU 102 determining a first sequence of coded bits associated with the first type of service/priority level; determining, positions in the first sequence of coded bit associated with the first type of service/priority level to be replace with coded bits of the associated with the second type of service/priority level; removing, at the coded bits of the first sequence at the determined positions; and/or inserting, at the determined positions coded bits associated with the second type of service/priority level.

FIG. 17 is a flowchart illustrating a representative procedure to avoid anticipated collisions.

Referring to FIG. 17, the representative procedure 1700 may include, at block 1710, a WTRU 102 selecting any of: (1) a multiplexing operation to multiplex coded bits of a first type of service/priority level with coded bits of a second type of service/priority level; (2) an overwriting operation to overwrite coded bits of a first type of service/priority level with coded bits of a second type of service/priority level; and/or (3) a dropping/inserting operation to drop coded bits of a first type of service/priority level and to insert, into the positions of the dropped coded bits, coded bits of a second type of service/priority level based on suitability criteria. At block 1720, the WTRU 102 may generate a sequence of coded bits associated with the first and second service using the selected operation. At block 1730, the WTRU 102 may generate, using the sequence of coded bits, a signal for transmission. At block 1740, the WTRU 102 may transmit to a network entity, the signal.

In certain representative embodiments, the suitability criteria may be based on any of: (1) service-based priority levels; (2) latency requirements of the second type of service/priority level; (3) a duration of colliding resources; (4) an end time of the colliding resources; (5) a maximum time delay and/or offset configured by higher layers; (6) a periodicity of the colliding resources; (7) a reliability requirement of the second type of service/priority level; (8) a number of coded modulation symbols per layer being below a first threshold; (9) a maximum amount of overwriting; (10) a coding rate associated with the colliding resources being less than a second threshold; and/or (11) a total number of coded bits associated with the first or second type of service/priority level being less than a maximum payload configured for the colliding resources.

Figure 18:
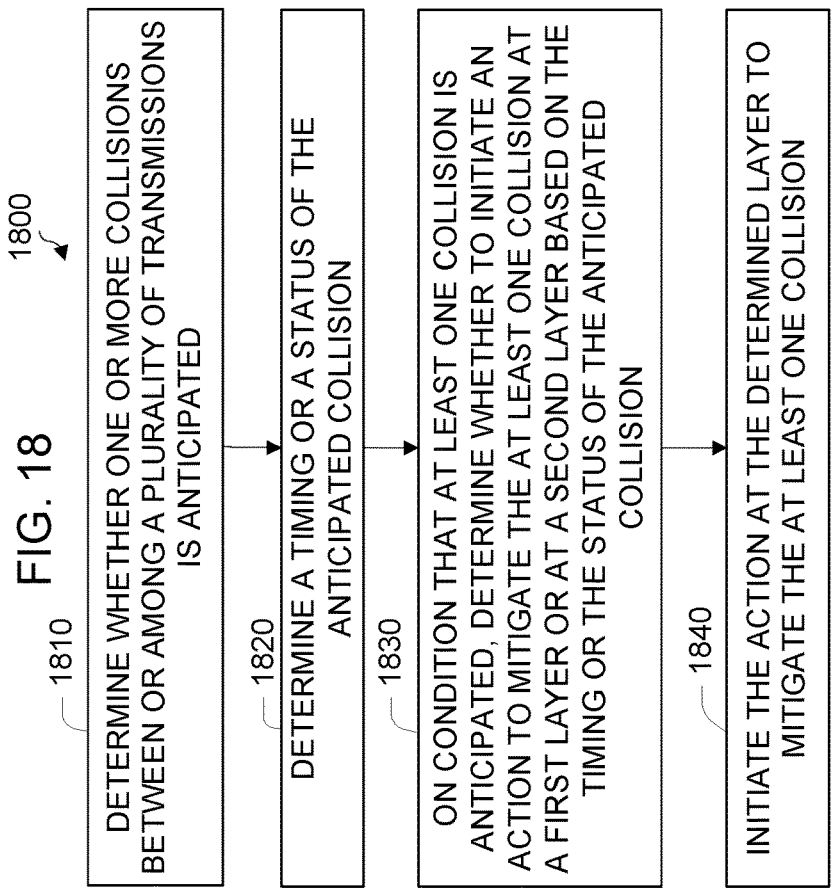
FIG. 18 is a flowchart illustrating a representative multiplexing procedure.

FIG. 18 is a flowchart illustrating a representative multiplexing procedure.

Referring to FIG. 18, the representative procedure 1800 may include, at block 1810, a WTRU 102 determining whether one or more collisions between or among a plurality of transmissions is anticipated. At block 1820, the WTRU 102 may determine a timing or a status of the anticipated collision. At block 1830, on condition that at least one collision is anticipated, the WTRU 102 may determine whether to initiate an action (e.g., to drop and/or not begin certain anticipated subsequent actions) to mitigate the at least one collision at a first layer or at a second layer based on the timing or the status of the anticipated collision. At block 1840, the WTRU 102 may initiate the action at the determined layer to mitigate the at least one collision. For example, the anticipate collision may be between any of: (1) a Physical Uplink Shared Channel (PUSCH) and a Scheduling Request (SR); (2) the PUSCH and Uplink Control Information (UCI); and/or (3) higher priority uplink control information and lower priority uplink control information.

In certain representative embodiments, the WTRU 102 may determine whether a Scheduling Request (SR) or Uplink Control Information (UCI) to be transmitted in a first transmission is already signaled to a physical layer, as the first layer, or whether construction of the PUSCH has started at the physical layer.

In certain representative embodiments, the WTRU 102 may determine to initiate the action at the physical layer on condition that the SR or the UCI is already signaled to the physical layer or that the construction of the PUSCH has started at the physical layer; or (2) determine to initiate the action at the MAC layer on condition that the SR or the UCI is not signaled to the physical layer or that the construction of the PUSCH has not started at the physical layer. For example, the WTRU 102 may not construct a MAC PDU, if the WTRU 102 has signaled an SR of higher priority that overlaps with the PUSCH.

For example, the initiation of the action at the determined layer may include any of: (1) dropping the SR or the UCI at the physical layer after the SR or the UCI had been signaled; (2) stopping the signaling of the SR or the UCI at the MAC layer; (3) dropping or suspending the PUSCH at the physical layer; and/or (4) stopping signaling of the PUSCH at the MAC layer.

Figure 19:
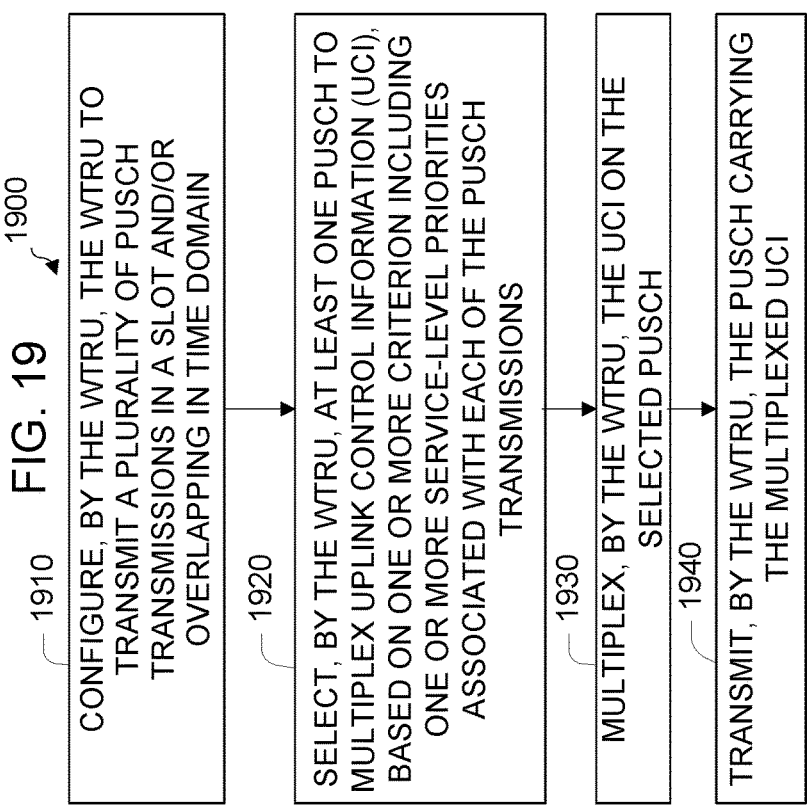
FIG. 19 is a flowchart illustrating a representative procedure (e.g., for transmission of uplink control information (UCI).

FIG. 19 is a flowchart illustrating a representative procedure (e.g., for transmission of uplink control information (UCI).

Referring to FIG. 19, the representative procedure 1900 may include, at block 1910, a WTRU 102 configuring the WTRU to transmit a plurality of PUSCH transmissions in a slot and/or overlapping in time domain. At block 1920, the WTRU 102 may select at least one PUSCH to multiplex Uplink Control Information (UCI), based on one or more criterion including one or more service-level priorities associated with each of the PUSCH transmissions. At block 1930, the WTRU 102 may multiplex the UCI on the selected PUSCH. At block 1940, the WTRU 102 may transmit the PUSCH carrying the multiplexed UCI. For example, the one or more criterion may include whether the PUSCH transmission is suitable for transmission of a combination of UCI and data.

In certain representative embodiments, the PUSCH transmissions in the slot or overlapping may be on different serving cells and/or different carriers and/or each PUSCH transmission may have a different service-related priority.

In certain representative embodiments, the WTRU 102 may select the PUSCH for multiplexing UCI based on a service-level priority of the PUSCH and/or a service-level priority of the UCI.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mate-able and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable storage medium as instructions for execution by a computer or processor to perform the actions described hereinabove. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), the method comprising:
   receiving configuration information indicating a plurality of physical uplink control channel (PUCCH) resource sets to be used for transmission of hybrid automatic repeat request (HARQ) information, wherein each of the plurality of PUCCH resource sets includes a plurality of PUCCH resources;
   receiving, in first downlink control information (DCI), information including (1) a first PUCCH set indication and (2) a first resource indicator;
   receiving a first physical downlink shared channel (PDSCH) transmission according to the first DCI;
   selecting a PUCCH resource set from the plurality of PUCCH resource sets based on at least the first PUCCH set indication;
   selecting a PUCCH resource from the plurality of PUCCH resources of the selected PUCCH resource set based on at least the first resource indicator, wherein the first PUCCH set indication and the first resource indicator are separate fields in the first DCI; and
   sending a PUCCH transmission including HARQ information using the selected PUCCH resource.

2. The method of claim 1, further comprising:
   receiving, in second DCI, information including (1) a second PUCCH set indication and (2) a second resource indicator; and
   receiving a second PDSCH transmission according to the second DCI;
   wherein the PUCCH resource set is selected from the plurality of PUCCH resource sets based on at least the first PUCCH set indication and the second PUCCH set indication.

3. The method of claim 2, further comprising determining first HARQ-ACK information associated with the first PDSCH transmission, and second HARQ-ACK information associated with the second PDSCH transmission.

4. The method of claim 3, further comprising determining that a first PUCCH resource indicated by the first resource indicator and a second PUCCH resource indicated by the second resource indicator overlap.

5. The method of claim 4, further comprising determining whether lower priority HARQ information is allowed to be multiplexed with higher priority HARQ information and, on condition that lower priority HARQ information is allowed to be multiplexed with higher priority HARQ information, multiplexing the first and second HARQ information and sending the multiplexed first and second HARQ information in the PUCCH transmission.

6. The method of claim 4, wherein on condition that lower priority HARQ information is not allowed to be multiplexed with higher priority HARQ information, the PUCCH transmission includes the higher priority HARQ information and does not include the lower priority HARQ information.

7. The method of claim 4, wherein, on condition that a first PUCCH resource indicated by the first resource indicator and a second PUCCH resource indicated by the second resource indicator overlap, the PUCCH transmission is associated with one of: (1) the first PUCCH set indication that has a higher priority than the second PUCCH set indication, or (2) the second PUCCH set indication that has a higher priority than the first PUCCH set indication.

8. The method of claim 7, wherein the PUCCH transmission is associated with the first PUCCH set indication.

9. The method of claim 7, wherein the PUCCH transmission is associated with the second PUCCH set indication.

10. The method of claim 7, further comprising
determining that the first PUCCH resource indicated by the first resource indicator and the second PUCCH resource indicated by the second resource indicator overlap any of: (1) in frequency or (2) in time.

11. The method of claim 7, wherein the first DCI includes a first field indicating a first index associated with the first PUCCH resource and the second DCI includes a second field indicating a second index associated with the second PUCCH resource.

12. The method of claim 11, wherein the first PUCCH set indication indicates a first priority associated with the first index and the second PUCCH set indication indicates a second priority associated with the second index.

13. A wireless transmit/receive unit (WTRU), comprising:
a receiver and a transmitter, wherein the receiver is configured to:
receive configuration information indicating a plurality of physical uplink control channel (PUCCH) resource sets to be used for transmission of hybrid automatic repeat request (HARQ) information, wherein each of the plurality of PUCCH resource sets includes a plurality of PUCCH resources;
receive, in first downlink control information (DCI), information including (1) a first PUCCH set indication and (2) a first resource indicator;
receive a first physical downlink shared channel (PDSCH) transmission according to the first DCI; and
a processor configured to select a PUCCH resource set from the plurality of PUCCH resource sets based on at least the first PUCCH set indication and select a PUCCH resource from the plurality of PUCCH resources of the selected PUCCH resource set based on at least the first resource indicator, wherein the first PUCCH set indication and the first resource indicator are separate fields in the first DCI,
wherein the transmitter is configured to send a PUCCH transmission including HARQ information using the selected PUCCH resource.

14. The WTRU of claim 13, wherein the receiver is configured to:
receive, in second DCI, information including (1) a second PUCCH set indication and (2) a second resource indicator; and
receive a second PDSCH transmission according to the second DCI;
wherein the PUCCH resource set is selected from the plurality of PUCCH resource sets based on at least the first PUCCH set indication and the second PUCCH set indication.

15. The WTRU of claim 14, wherein, on condition that a first PUCCH resource indicated by the first resource indicator and a second PUCCH resource indicated by the second resource indicator overlap, the PUCCH transmission is associated with one of: (1) the first PUCCH set indication that has a higher priority than the second PUCCH set indication, or (2) the second PUCCH set indication that has a higher priority than the first PUCCH set indication.

16. The WTRU of claim 15, wherein the PUCCH transmission is associated with the first PUCCH set indication.

17. The WTRU of claim 15, wherein the PUCCH transmission is associated with the second PUCCH set indication.

18. The WTRU of claim 15, wherein the processor is configured to determine that the first PUCCH resource indicated by the first resource indicator and the second PUCCH resource indicated by the second resource indicator overlap any of: (1) in frequency or (2) in time.

19. The WTRU of claim 15, wherein the first DCI includes a first field indicating a first index associated with the first PUCCH resource and the second DCI includes a second field indicating a second index associated with the second PUCCH resource.

20. The WTRU of claim 19, wherein the first PUCCH set indication indicates a first priority associated with the first index and the second PUCCH set indication indicates a second priority associated with the second index.

21. The WTRU of claim 14, wherein the processor is configured to determine first HARQ-ACK information associated with the first PDSCH transmission, and second HARQ-ACK information associated with the second PDSCH transmission.

22. The WTRU of claim 21, wherein the processor is configured to determine that a first PUCCH resource indicated by the first resource indicator and a second PUCCH resource indicated by the second resource indicator overlap.

23. The WTRU of claim 22, wherein the processor is configured to determine whether lower priority HARQ information is allowed to be multiplexed with higher priority HARQ information, and wherein on condition that lower priority HARQ information is allowed to be multiplexed with higher priority HARQ information, the transmitter is configured to multiplex the first and second HARQ information and send the multiplexed first and second HARQ information in the PUCCH transmission.

24. The WTRU of claim 22, wherein on condition that lower priority HARQ information is not allowed to be multiplexed with higher priority HARQ information, the PUCCH transmission includes the higher priority HARQ information and does not include the lower priority HARQ information.

25. A wireless transmit/receive unit (WTRU), comprising:
a receiver and a transmitter, wherein the receiver is configured to:
- receive configuration information indicating a plurality of physical uplink control channel (PUCCH) resource sets to be used for transmission of hybrid automatic repeat request (HARQ) information, wherein each of the plurality of PUCCH resource sets includes a plurality of PUCCH resources;
- receive, in first downlink control information (DCI), information including (1) a first PUCCH set indication; and (2) a first resource indicator, wherein the first PUCCH set indication and the first resource indicator are separate fields in the first DCI;
- receive a first physical downlink shared channel (PDSCH) transmission according to the first DCI;
- receive, in second DCI, information including (1) a second PUCCH set indication and (2) a second resource indicator, wherein the second PUCCH set indication and the second resource indicator are separate fields in the second DCI;
- receive a second PDSCH transmission according to the second DCI; and a processor configured to:
- determine first HARQ information associated with the first PDSCH transmission;
- select a first PUCCH resource set from the plurality of PUCCH resource sets based on at least the first PUCCH set indication, and select a first PUCCH resource from the plurality of PUCCH resources of the selected first PUCCH resource set based on at least the first resource indicator;
- determine second HARQ information associated with the second PDSCH transmission;
- select a second PUCCH resource set from the plurality of PUCCH resource sets based on at least the second PUCCH set indication and select a second PUCCH resource from the plurality of PUCCH resources of the selected second PUCCH resource set based on at least the second resource indicator;
- determine a priority for each of the first and second HARQ information;
- on condition that the first PUCCH resource overlaps in time with the second PUCCH resource, and on condition that the priority of the first HARQ information is different than the priority of the second HARQ information, determine whether lower priority HARQ information is allowed to be multiplexed with higher priority HARQ information;

wherein, on condition that lower priority HARQ information is allowed to be multiplexed with higher priority HARQ information, the transmitter is configured to multiplex the first and second HARQ information and send the multiplexed first and second HARQ information in a single PUCCH transmission.

26. The WTRU of claim 25, wherein on condition that lower priority HARQ information is not allowed to be multiplexed with higher priority HARQ information, the single PUCCH transmission includes the higher priority HARQ information and does not include the lower priority HARQ information.

27. The WTRU of claim 25, wherein the first DCI includes a first field indicating a first index associated with the first PUCCH resource and the second DCI includes a second field indicating a second index associated with the second PUCCH resource.

28. The WTRU of claim 27, wherein the first PUCCH set indication indicates a first priority is associated with the first index and the second PUCCH set indication indicates a second priority associated with the second index.

* * * * *